United States Patent [19]

Thompson et al.

[11] 4,399,525

[45] Aug. 16, 1983

[54] METHOD FOR INTERPRETING WELL LOG RECORDS TO YIELD INDICATIONS OF GAS/OIL IN AN EARTH FORMATION SUCH AS A SANDSTONE, LIMESTONE, OR DOLOSTONE

[75] Inventors: Don D. Thompson, Corona Del Mar; Robert J. S. Brown, Fullerton; Richard J. Runge, Anaheim, all of Calif.

[73] Assignee: Chevron Research Company, San Francisco, Calif.

[21] Appl. No.: 293,540

[22] Filed: Aug. 17, 1981

Related U.S. Application Data

[63] Continuation of Ser. No. 82,382, Oct. 5, 1979, abandoned.

[51] Int. Cl.³ .............................................. G01V 1/30
[52] U.S. Cl. ........................................ 367/75; 367/73; 364/421
[58] Field of Search .................... 367/73, 75; 364/421, 364/422

[56] References Cited

U.S. PATENT DOCUMENTS 3,241,102  3/1966  Peterson ............................... 367/75

OTHER PUBLICATIONS

Zemtsova et al., "Rogvedochnaya Geofizika", 1966, pp. 3–17, #15, 367/75.

Primary Examiner—Nelson Moskowitz

Attorney, Agent, or Firm—H. D. Messner; Edward J. Keeling

[57] ABSTRACT

The present invention indicates that acoustic characteristics associated with a first well penetrating a gas/oil-containing strata such as a sandstone, limestone or dolostone, can be normalized (and favorably compared) with similar characteristics of a second, contiguous well of known hydrocarbon potential, such characteristics being calculated and displayed by means of a machine-implemented data processing method in which well logging and geologic data are fed thereto to calculate such characteristics without the need for shear-wave velocities.

In more detail, in accordance with the invention brine-saturated bulk and shear moduli, (i.e., Kw* and Gw*) of a sandstone, limestone or dolostone penetrated by the second well can be predicted as a function of, say, brine-saturated P-wave modulus (Pw*) alone (independent of shear-wave velocity). In that way, resulting acoustic values including distinct velocity and amplitude values as a function of a saturation operator can ultimately be provided. Such values, when compared to actual, in-well, field-generated characteristics of the first well, are surprisingly accurate predictors of the amount of gas/oil maturation in and around the first well. The method has particular accuracy in designating gas zones within formations of interest due to use of the complete Benedict-Webb-Rubin non-ideal gas law in pseudo-reduced form.

21 Claims, 5 Drawing Figures

METHOD FOR INTERPRETING WELL LOG RECORDS TO YIELD INDICATIONS OF GAS/OIL IN AN EARTH FORMATION SUCH AS A SANDSTONE, LIMESTONE, OR DOLOSTONE

This is a continuation of application Ser. No. 82,382, filed Oct. 5, 1979.

DISCLAIMER

While the Abstract, supra, has been carefully written, the purpose of such statements is to provide a non-legal description of the contents of this application as a searching, scanning and classification aid for technical persons. Accordingly, all hereinbefore-presented statements are not intended to be used in understanding or otherwise comprehending the principles of the invention hereinafter described in detail and are not, more particularly, to be used in interpreting or in any way limiting the scope or fair interpretation of the claims appended hereto.

RELATED APPLICATIONS

Don D. Thompson, Robert J. S. Brown and Richard J. Runge, Ser. No. 322,509, filed Nov. 18, 1981, "Method for Interpreting Seismic Records to Yield Indications of Gas/Oil in an Earth Formation", and Ser. No. 83,189, filed Oct. 9, 1979 for "Method for Interpreting Seismic Records to Yield Indications of Gas/Oil in an Earth Formation such as a Sandstone, Limestone, or Dolostone".

FIELD OF THE INVENTION

The present invention pertains to the art of well logging, and more particularly to the art of interpreting amplitude and velocity anomalies observed on well logs into diagnostic indicators of the presence and amounts of gas/oil in the surrounding subsurface strata.

BACKGROUND OF THE INVENTION

For several decades, well logs have been used by oil-field operators for a variety of purposes, inter alia, to indicate presence of oil and gas, to determine lithology, to indicate stratigraphy, etc. Identifying the content of a producing basin has also been of particular interest. Such information often can be constructed using data taken from two or more contiguous wells within the region of interest; however, the results provided by such analysis have not always been accurate, especially in the area of predicting gas saturation based on the characteristics of the amplitude anomalies of the well logs.

The present invention improves the ability of the well log interpreter to correctly interpret gas as well as gas/oil content of a formation penetrated by a first well normalized to (and comparable with) a series of patterned acoustic characteristics associated with zones of similar mineralogy and determinable gas or gas/oil saturations of a second contiguous well.

OBJECT OF THE INVENTION

An object of the invention is the provision of a novel method of correctly predicting gas and/or gas/oil saturations of hydrocarbon-bearing structures using at least in part anomalies provided by well logs.

SUMMARY OF THE INVENTION

The present invention indicates that acoustic characteristics associated with a first well penetrating a gas/oil-containing strata such as sandstone, limestone or dolostone can be normalized (and favorably compared) with similar synthetic values of a second, contiguous well, such values being calculated and displayed by means of a machine-implemented data processing method in which well logging and geologic data are fed thereto to calculate such values.

In more detail, in accordance with the invention brine-saturated bulk and shear moduli, (i.e., $Kw^*$ and $Gw^*$) of a sandstone, limestone or dolostone penetrated by the second well can be predicted, say, as a function of brine-saturated P-wave modulus ($Pw^*$) (independent of shear-wave velocity), thereafter a surprisingly accurate estimation of bulk moduli of the fluid-filled pore spaces as a function of gas and/or oil saturation can occur. In that way, various synthetic values (say velocities, amplitudes, etc.) as a function of depth and of gas/oil saturation can be provided. Ultimately, such values when compared to actual field-generated values of the first well have accurate prognostic capabilities as to the amount of gas/oil saturation in the zone of interest. The method has particular accuracy in designating gas zones within formations of interest due to use of the complete Benedict-Webb-Rubin non-ideal gas law in pseudo-reduced form.

DESCRIPTION OF THE DRAWINGS

Further features of the invention will become more apparent upon consideration of the following detailed description of the invention when taken in connection with the accompanying drawings, wherein.

PREFERRED EMBODIMENTS OF THE INVENTION

Before discussion of an embodiment of the invention with an actual field environment, a brief description of the mathematical and theoretical concepts behind the discovery may prove beneficial and are presented below.

Firstly, it may be of interest to indicate lithology limitations associated with the present invention. Anomalies associated with gas or gas/oil sands or sandstone over shale rock cap are one example where the method of the present invention offers surprising predictive well-to-well capabilities. Another example relates to gas-saturated limestone or gas/oil-saturated limestone over shale. Still another is fluid-saturated dolostone capped by shale or the like. Secondly, it should be pointed out that certain relationships or various petrophysical parameters are also of great importance, viz., bulk and shear moduli of a rock formation as a function of the P-wave modulus in the zone of interest.

Figure 1:
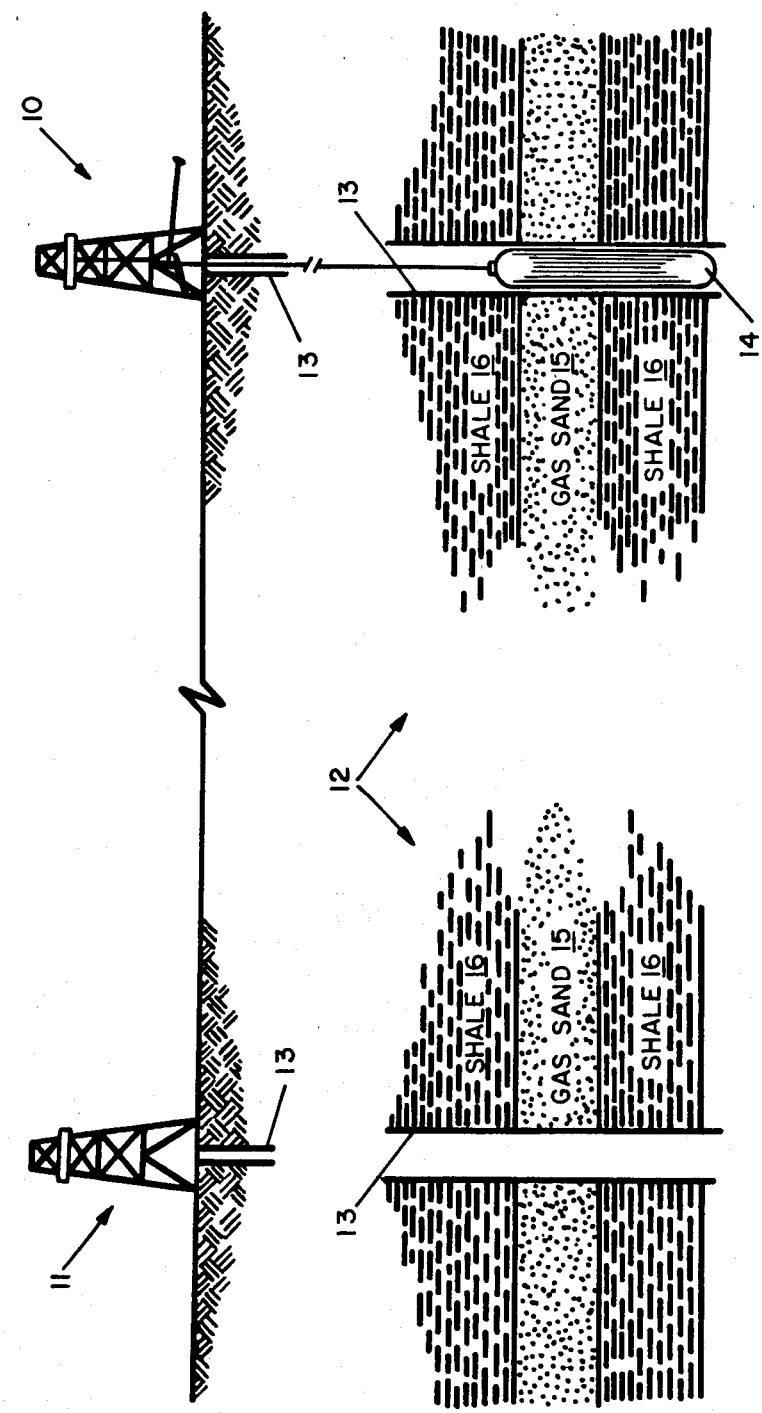
FIG. 1 is an elevational view of an earth formation penetrated by adjacent first and second wells wherein the first well has unknown hydrocarbon potential while the hydrocarbon potential of the second well is known (although it can be zero)

Now, in more detail, attention should be directed to the Figures, particularly FIG. 1, in which the field-collection phase of the present invention is shown. Note that, inter alia, FIG. 1 illustrates contiguous first and second wells 10 and 11 penetrating an earth formation 12. Each well 10, 11 includes a bore 13 in which a logging sonde 14 (shown within well 10) can be lowered and operated to provide well data. Particular purpose of the operating sonde 14: to provide well log velocity data by which the gas/oil saturation of sand 15 embedded in a shale stratum 16 can be determined, as set forth below. Parenthetically, the formation 12 is typical of a young, shallow geologic section found in the Gulf Coast of the United States.

Briefly, in accordance with the present invention, sonic velocity data from well 11 of known hydrocarbon potential is generated and then used in conjunction with data associated with well 10 to predict the hydrocarbon potential of the latter. The strata of interest surrounding the well 10 need not be of oil/gas-bearing quality; it can be zero in this regard, but its contiguousness and continuity with respect to well 11 must be known.

Figure 2:
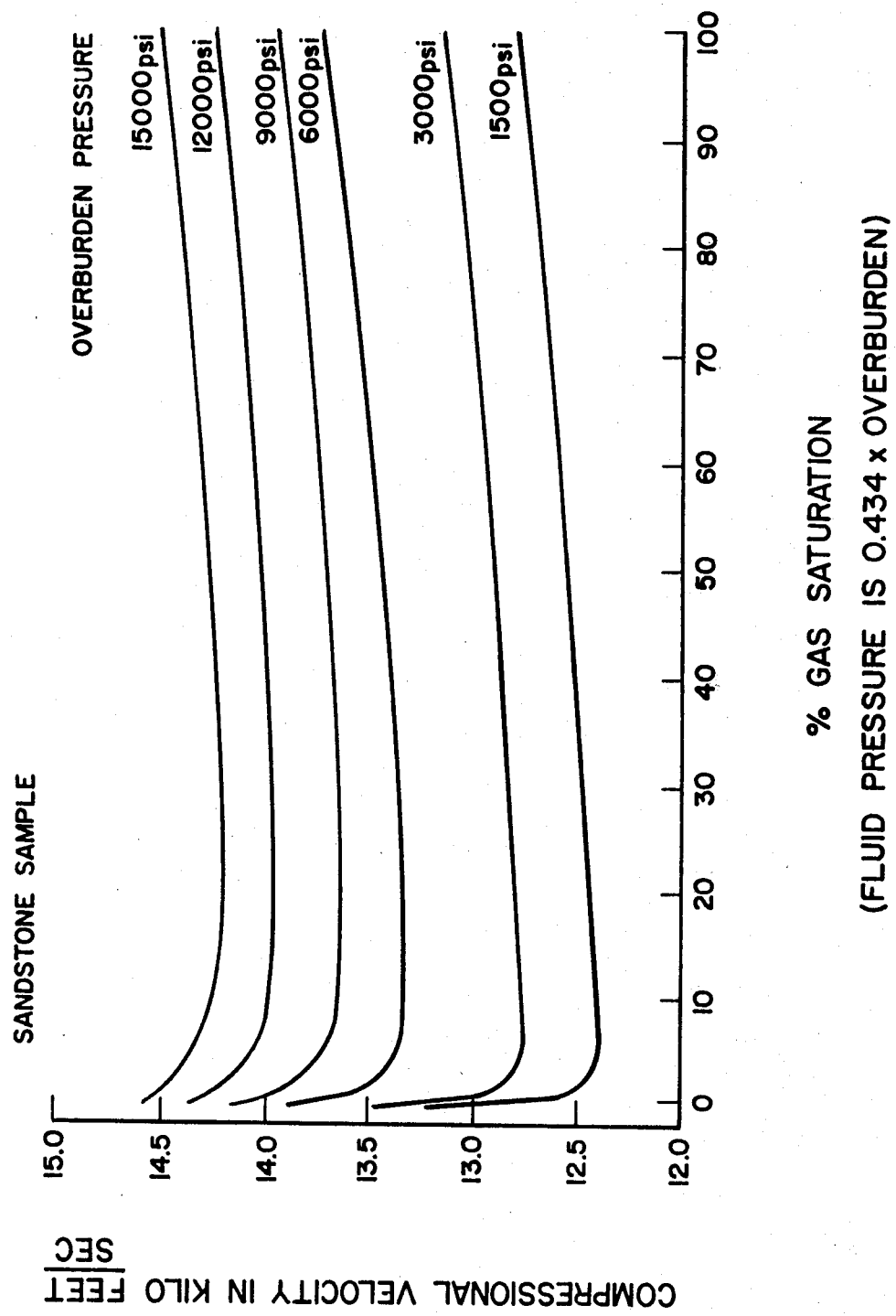
FIG. 2 is a plot of percentage of gas saturation vs. compressional velocity as a function of change in pressure (depth) of a particular subsurface material.

And how various gas fractions affect elastic moduli and compressional velocity, which can be of monumental interest to well log interpreters, is depicted in FIG. 2.

FIG. 2 also illustrates to some degree the complexity that is involved in relating various petrological parameters one to the other to the elastic moduli in the presence of gas. E.g., FIG. 2 shows that very small gas saturations cause nearly as much reduction in moduli of compression as do larger gas saturations. In highly porous sandstone a very small gas saturation may lead to a substantial reduction in compressional wave velocities, especially at low differential pressures. Briefly, the present invention shows that appropriate expressions can, in fact, be provided for calculating the elastic moduli of competent and incompetent strata based on reasonable assumptions, followed by a determination of synthetic characteristics as a function of oil/gas saturations of a well penetrating the formation of interest. Comparison techniques with actual field-collected data of another well of interest then can be utilized. Result: accurate estimations of gas/oil saturations for sandstone, limestone or dolostone strata penetrated by the latter occur. The expressions for providing such data are derived, in part, from surprising laboratory measurements to be described below. Also, well logging and other geologic data of the zone of interest are involved to some degree. Still further, the method has particular accuracy in designating gas zones or mixtures of gas/oil or gas/oil/brines in the zones of interest due to use of the complete Benedict-Webb-Rubin non-ideal gas law in pseudo-reduced form, in which assumed adiabatic conditions improve accuracy to a surprising degree. Additionally, for ease of printing, Greek symbols have been omitted and the following equivalents substituted:

$\rho$gas = rho-gas
$\rho_B$ = rho-B
$\sigma^*$ = sigma*
$\gamma_r$ = gamma-r

GENERAL PRINCIPLES

Expressions shown below relate densities, velocities and elastic moduli. First, in accordance with theory:

$$\rho_B V_p^2 = P^* = K^* + (4/3)G^* \quad (18)$$

and $$\rho_B V_s^2 = G^* \quad (19)$$

Here, rho-B is the bulk density (including contributions of pore fluids; Vp is the P-wave velocity, or plane-compressional-wave velocity; Vs is the shear-wave velocity; P* is the P-wave elastic modulus; K* is the compressional modulus (reciprocal of the compressibility) and G* is the shear modulus, or modulus of rigidity.

GENERAL DEFINITIONS

The rocks in these equations are assumed to be macroscopically homogeneous and isotropic. In fact, macroscopic isotropy and homogeneity are assumed to exist when petrological parameters are represented by only density and two other parameters, such as Vp and Vs or else G* and K*. The asterisk superscript (*) applied to an elastic modulus indicates reference to porous rock with fluid (any mixture of brine, oil and gas) in the pores. By measurement of rho-B, Vp and Vs, other parameters such as P*, K*, G*, Young's modulus or Poisson's ratio can be imparted.

Two additional macroscopic elastic moduli, the solid-material elastic modulus Km or Gm and the solid-frame modulus Ka, can be used.

If the solid material of a porous rock is reassembled in such a manner that there is no pore space, the resulting elastic moduli depend on the manner in which the material is assembled. However, upper and lower limits to the moduli can be computed. For such hypothetical rocks without pore space, upper and lower limits are not widely separated, and the means between these limits will be indicated by subscripts "m". Thus, Km and Gm are solid-material moduli. These quantities are set forth below in Table I.

TABLE I

Plastic Data and References for Some Sedimentary Minerals

| Mineral | Bulk Modulus in Kbars | Shear Modulus in Kbars | Grain Density | References |
|---|---|---|---|---|
| Quartz | 380 | 444 | 2.65 | (1) |
| Calcite | 767 | 323 | 2.71 | (2) |
| Dolomite | 948 | 457 | 2.87 | (2) |
| Biotite ("Clay") | 504 | 275 | 2.68 | (1) |
| Anhydrite | 563 | 291 | 2.98 | (3) |
| Siderite | 1240 | 510 | 3.96 | (4) |
| Barite | 546 | 238 | 4.51 | (1) |
| Hematite | 978 | 931 | 5.24 | (1) |
| Pyrite | 1581 | 1487 | 5.02 | (1) |
| Rutile | 2230 | 1035 | 4.26 | (1) |
| Halite | 252 | 153 | 2.16 | (1) |

(1) G. Simmons, J. Grad. Res. Center, Vol. 39, 3/65, SMU Press
(2) P. Humbert & F. Plicque, Compt. Rendus B275, 391 (1972)
(3) W. Schwerdtner, Can. J. Earth Sci., 2, 673 (1965)
(4) N. Christensen, J. Geophys. Res. 77, 369 (1972)

But if the pore space in a porous rock is all connected, and if the differential pressure in the fluid in the pores is held constant during a small change in the externally applied pressure, the ratio of the pressure change to the relative change in the bulk volume is the solid-frame modulus of compressibility, Ka. This modulus is sometimes referred to as the modulus of compressibility of the rock with the pore system empty. However, many oilfield rocks contain clays which may be altered by actually drying the rocks to empty the pore system. It is also possible that certain surface forces may be different when all water is removed from the pore system of a rock. It is also possible that there are several different possibilities for finding values of Ka.

If all pore space is connected, and if the rock is macroscopically homogeneous and isotropic, a change in the pore pressure cannot lead to macroscopic shear strains, since excluded from the specification of the system is anything which could define direction. Therefore, the compressibility of the fluid cannot influence the macroscopic shear modulus of the rock. Thus, $G^* = Ga$ for a rock satisfying the above conditions.

Note, however, that the dynamic elastic moduli of rocks usually depend on the static stresses and therefore on the fluid pressure in the pore system. This, in turn, affects the differential pressure, or the pressure supported by the elastic framework of the rock. Furthermore, note the requirement that there be time for the fluid pressure to equalize throughout the pore system. If the pore space is not connected, this cannot happen at all. If there are localized regions of low permeability, there may not be enough time for pressure equalization in the pore system if pressure changes are applied at high frequency. The time required for pressure equalization depends not only on the local permeability of the material but on the microscopic distribution of the pore fluid components. This consideration applies, for example, if the pore fluid is a mixture of brine and gas. The higher the seismic or sonic frequency, the finer must be the mixture of brine and gas.

However, in estimating gas/oil-saturation effects in accordance with the present invention, input parameters can be limited to compressional velocity, density and porosity, as set forth below.

THE EFFECT OF GAS SATURATION

Gassmann derived an equation (Gassmann, F., "Elasticity of Porous Media" in Vierteljahrschrift der Naturforshenden Gesellschaft in Zürich, Heft I, 1951) and given also in a book by White (J. E. White, "Seismic Waves: Radiation, Transmission and Attenuation", McGraw-Hill, N.Y., 1965), relating $K^*$ and $Ka$.

$$K^* = K_a + K_f \frac{(1 - K_a/K_m)^2}{(1 - K_f/K_m)\phi + (K_f/K_m)(1 - K_f/K_m)} \quad (20a)$$

or the equivalent, $$K_a = K^* - K_f \frac{(1 - K^*/K_m)^2}{(1 - K_f/K_m)\phi - (K_f/K_m)(1 - K^*/K_m)} \quad (20b)$$

or another equivalent, $$\frac{1}{K_m - K^*} - \frac{1}{K_m - K^{*\prime}} = \frac{1}{\phi}\left[\frac{1}{K_m - K_f} - \frac{1}{K_m - K'_f}\right] \quad (20c)$$

or still another equivalent, $$(K^* - K_a)/K_m = K_f/K_m = b - a = \quad (20d)$$

$$\frac{(1 - a)^2}{f\phi + (1 - a)} = \frac{(1 - b)^2}{f\phi - (1 - b)}$$

where $a = Ka/Km$; $b = K^*/Km$; $g = G^*/Gm = Ga/Gm$; $f = (Km/Kf) - 1$.

Here $\phi$ is the fractional porosity, Kf is the compressibility modulus of the fluid in the pores, and the primes (') indicate values for a different pore fluid system. Thus, if $Kf' = 0$, the $K^{*\prime}$ becomes Ka. If the pore fluid is a multiphase system, such as any mixture of brine, oil and gas, Kf can be calculated by noting that the compressibility of a fluid mixture is the volume-weighted average of the compressibilities of the components. Thus, for a gas-brine mixture, $$\frac{1}{K_f} = \frac{S_{gas}}{K_{gas}} + \frac{(1 - S_{gas})}{K_{brine}} \quad (39)$$

where Sgas is the fractional gas saturation.

It can be seen from Equations 19 and 20a–20e that, if $G^*$, $P^*$, Km, Kf and $\phi$ are known, calculations are straightforward. But since $G^*$ and Km are not known, simultaneous solutions of equations is a distinct possibility and is set forth in detail below. If $K^*$ for two different values of Kf is measured, two equations with two unknowns are provided and both Ka and Km can be determined. Km may be computed with adequate accuracy from estimates of the composition of the solid framework of the rock, as set forth below, in which case measurements of $K^*$ and $\phi$, together with knowledge or estimates of Kf and Km give values of Ka.

Equations 18, 19 and 20a–20c are rigorously true if the rock is macrohomogeneous, sacroisotropic, all pore space connected, time is allowed for pressure equalization in the pore fluid, and the material of the solid framework is microhomogeneous and microisotropic. The assumptions of microisotropy and microhomogeneity are not satisfied rigorously for real rocks. The lack of microisotropy in probably well accounted for by the spatial averaging employed in the determination of the "isotropized" values of the compressional moduli of the rock-forming minerals given in Table I, supra. It is highly probable that anisotropic mineral grains are deposited more or less randomly. Even if they are not, the directions of the stress vary greatly in a granular rock, justifying the spatial averaging.

The effects of microhomogeneity of the solid material of the rock may affect the strict validity of Equations 20a–20e supra if one or the components of the solid framework does not carry its share of the load and if that component has a compression modulus substantially different from those of other components. A candidate would be a sand consisting of a quartz framework with a large amount of clay or other materials with higher compressional moduli and attached in such a manner that it does not significantly share the stress.

It should be noted that if shear-wave logs would be available for the basin of interest, the bulk modulus can be calculated from the P- and S-wave transit times in the density of the zone of interest in accordance with Equations 18 and 19, supra. Unfortunately, the shear-wave logs needed for direct measurement of $K^*$ are not available for most basins.

Hence, a method is needed for accurately determining bulk and shear moduli of rock formations in such basins, these moduli being needed for use in the Biot-Gassmann relationship, i.e., the Equations 20a–20d supra, to model the influences of pore fluids on the bulk modulus, and therefore on the compression wave velocity. While these fluids may be either brine, liquid, hydrocarbon or gas or any combination thereof, the present invention relates to brine-gas mixtures principally but not exclusively.

In accordance with the present invention, only compressional velocity of the brine-saturated material, its brine-saturated density and porosity measurements are needed to estimate bulk and shear moduli for the zone of interest as functions of pressure, temperature and fluid content (gas saturation).

These equations which are set forth below and above permit an in-situ estimate of $K^*$ and $G^*$ as defined above, which may be based on measurement of the P-wave modulus of the aggregate (i.e., $Pw^*$) only, and do not require the need for shear-wave velocity. Also, a gas correction term applies only to well-consolidated sandstones, not to sand packs or loosely or poorly consolidated sands, as set forth in detail and discussed below.

A key to the above discovery that $Pw^*$ can be used to estimate the elastic moduli of the formation of interest on the basis of empirical expressions of the form $$\hat{G}_W^* = f_1(P_{ol}^*) \tag{21}$$

where $\hat{G}^*$ is the shear modulus, and the bulk modulus by the form $$\hat{K}_W^* = F_2(P_{ol}^*) \tag{22}$$

where $P_{ol}^*$ is the P-wave modulus. The subscript "ol" means "observed in the laboratory". Of course, the subscript "ow" is also operative in this context: in circumstances where P-wave modulus is "observed from well log data", as explained below.

The empirical coefficients for the above Equations 21 and 22 have been found for sands without performing undue experimentation and, moreover, produce correlation coefficients in a range of 0.927 to 0.962.

In general, Equations 21 and 22 are proven excellent predictors. E.g., the above equations have been found to give correlation coefficients of 0.96 and 0.93 respectively at the highest pressure conditions. A standard acoustic measurement system (AMS) can be used to determine densities, porosities and three moduli ($P^*$, $K^*$ and $G^*$) as a function of pressure of known materials to predict the coefficients of the above equations.

Note also that values of P-wave modulus estimated from well logs is in accordance with $$P_{ow}^* = \rho_B V_p^2 \tag{35}$$

where rho-B is the density and $V_p$ is the compressional velocity from such logs, as explained below.

However, mineralogy can also be a determining factor.

Note that the present invention not only allows the experimentor to specify that the formation is initially 100% brine saturated, but also to be able to specify that the lithology is sandstone, limestone, or dolostone. Detailed mineralogy permits him also to make a more accurate estimate, but it is not a necessary input variable. If detailed mineralogy is known, the volume percent of each component must be input in a manner shown in the method set forth below.

The program uses the Voight-Reuss-Hill (VRH) method to calculate the bulk modulus, Km, and the shear modulus, Gm, of the solid part of the rock.

If the detailed mineralogy is not used, the method of the present invention automatically defaults to "average" values of Km and Gm for each lithology.

If a rock is widely different in composition from "average" rocks, detailed mineralogy is necessary in order to do accurate estimates. For example, if a limestone contained quartz beyond about 25%, the Km, Gm default values for limestones could lead one into significant errors in estimation of fluid effects.

The limestone equations have practical validity in areas well represented by that particular sampling used above. Experience has shown that such data are particularly good predictors of velocity and porosity values in the Ardmore and Arcoma basins in the Midcontinent of the United States of America. However, the Biot-Gassmann relationship as set forth in Equation 20b should be used:

$$K_a = K^* - K_f \frac{(1 - K^*/K_m)^2}{(1 - K_f/K_m)\phi - (K_f/K_m)(1 - K^*/K_m)} \tag{20b}$$

where
Ka = frame modulus (the bulk modulus with empty pores)
Km = bulk modulus of the solid material
Kf = bulk modulus of the fluid (including the gas) in the pores.

The second term of the right-hand member of Equation 20d is referred to as the fluid correction term, Kfc, so that $K^* = Ka + Kfc$, as previously indicated.

Mathematical Modeling of Gas or Oil in Sandstone Formations

Equations 31 and 22 are assumed to be applicable in the area under study, as determined from well logs via equation 35. Without this assumption, calculation of fluid saturation effects on the P-wave modulus is not possible.

Parenthetically, there must be available from well logs +rho-B, $\phi$ and Vp, from which the observed P-wave modulus, $Pow^*$, is calculated ("ow" means "observed from well logs") by equation 35, supra. These data must come from a section of the well known to be 100% brine saturated. From these steps, the elastic moduli can be calculated.

Figure 3:
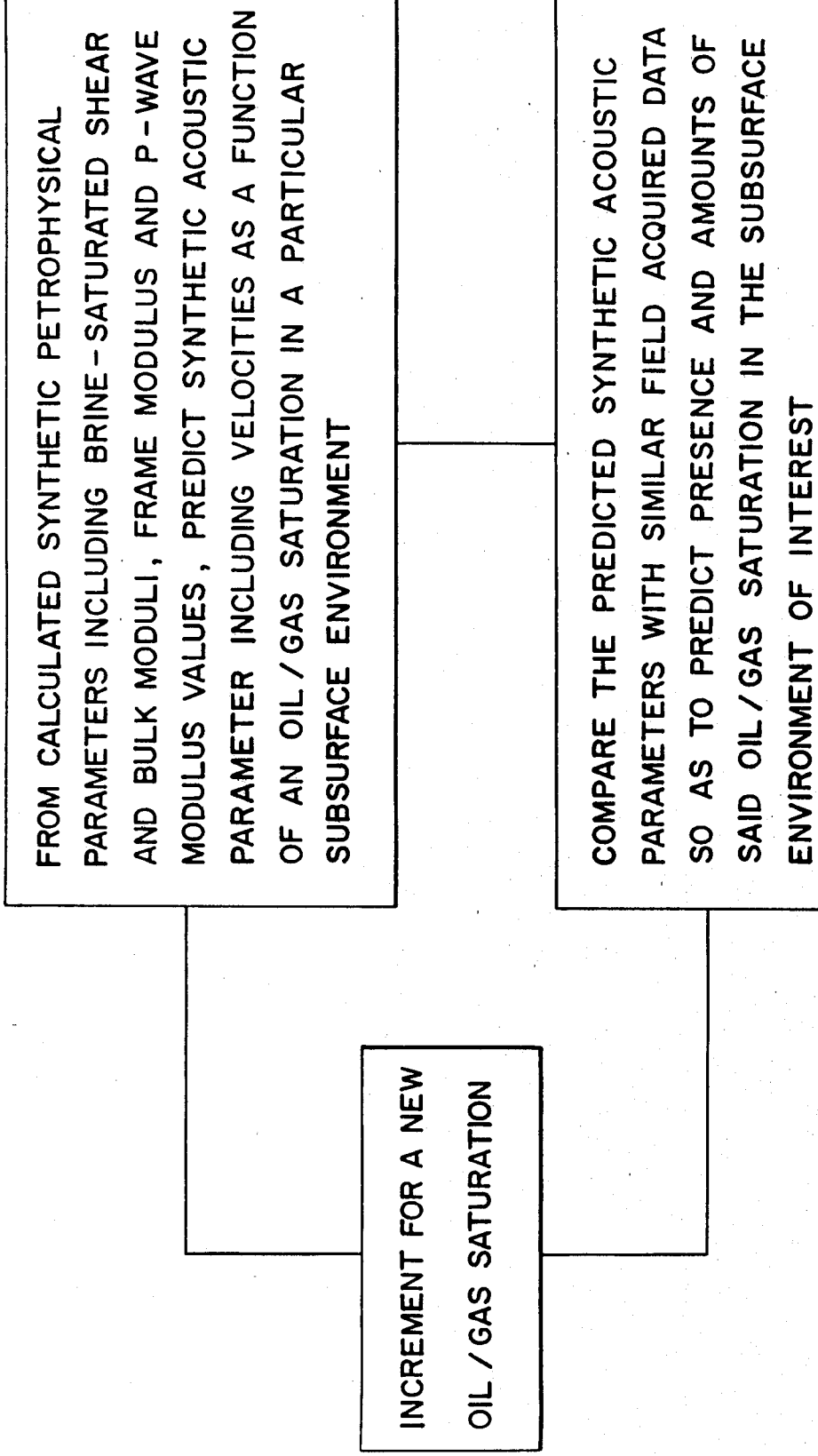
FIG. 3 is a diagram of process steps for carrying out the method of the present invention using, in at least part, programmed digital computing system.

FIG. 3 is a flow diagram of the data transformation process of the present invention.

Briefly, in the initial step, predicted shear modulus, $Gw^*$, for the depth (pressure) is calculted from the predictor Equation 21 supra, i.e., $$\hat{G}^* = F_1(P_{ol}^*) \tag{21}$$

In step (2), there is the calculation of the predicted bulk modulus, $\hat{K}w^*$, for the depth (pressure) from the predictor Equation 22 supra, i.e., $$\hat{K}^* = f_2(p_{ol}^*) \tag{22}$$

In step (3), to model gas-saturated formations, there is next calculated $\hat{K}a$ via Equations 20a–20d. In these statistical terms, Equations should be modified to read $$K_a = K^*_w - \frac{K_{br}(1 - K^*_w/K_m)^2}{(1 - K_{br}/K_m)\phi - K_{br}/K_m(1 - K^*_w/K_m)} \quad (20e)$$

where Kbr is the bulk modulus of brine. Assume a pressure-independent value of 25 Kber. The bulk modulus of the solid material, Ka, is also assumed to be pressure-independent.

From the several sandstone samples, a mean Km of 393 Kbar is noted with a standard deviation of less than 10%. This value can be used as a starting point if one has no other data.

It is physically impossible for $\hat{K}_w^*$ to exceed Km. However, the predicted modulus, $\hat{K}_w^*$, can exceed the mean value of Km. In that event, either:
1. abort the method for that set of data, or
2. independently determine the true value of Km.

Errors in Ka are apt to be largest for porosities less than about 5%. Above that value, we had no problems in this step of the calculation.

In step (4), calculation of $\hat{K}_{gas/oil}^*$, the predicted modulus with gas/oil present, can be in accordance with:

$$K^*_{gas/oil} = K + \frac{(1 - K_a/K_m)^2}{\phi/K_f + (1 - \phi)/K_m - K_a/K_m^2} \quad (23)$$

where Kf equals the bulk modulus of a liquid-gas mixture. It is equal to $$1/K_f = S_{gas}/K_{gas} + S_{oil}/K_{oil} = (1 - S_{gas} - S_{oil})K_{br} \quad (24)$$

where Sg and Soil are the fractional gas and oil saturations and Kg is the bulk modulus of the gas. The latter is both temperature- and pressure dependent.

Note that Ka and G* are independent of the fluid so that these values need not be recalculated. However, K* is a dependent variable with regard to the fluid in the pores of the rock of interest. Hence, its value is a function of the total bulk modulus of the fluid Kf.

Estimation of the bulk modulus of the gas and oil can be rigorous. Approximate methods to estimate the fluid modulus, Kf, for use in the Biot-Gassmann relations can be used, and are set forth supra.

Attempts to estimate the bulk modulus of a gas component, Kfgas, from either the isothermal or adibatic perfect gas laws are inadequate for some applications, but results can be obtained in the manner set forth below. In this method, the gas modulus and density are computed in accordance with an isothermal non-ideal equation of state for a gas in pseudo-reduced form as proposed by Benedict, Webb and Rubin; see Journal of Pet. Tech., Vol. 22, 1970, pp. 889–895.

OIL EQUATIONS

Bulk modulus and density for oil can be easily calculated and are, of course, necessary parts of the total fluid moduli and density calculations of a given gas/oil mixture. Oil density (rho-oil) can be calculated by $$\rho_{oil} = 141.5/(\gamma_{oil}[API] + 131.5) \quad (59)$$

Oil bulk modulus (Koil) can also be easily obtained:

$$K_{oil} = f_{10}\rho_{oil} \quad (60)$$

In step (5), equations 21 and 23 are used to obtain $\hat{P}_{gas/oil}^*$, according to the Biot-Gassmann theory, $$\hat{P}_{gas/oil}^* = \hat{K}_{gas/oil}^* + (4/3)\hat{G}_w^* \quad (61)$$

Pgas/oil is the predicted P-wave modulus with gas/oil present.

In step (6), to convert the moduli to velocities, use the aforementioned gas and oil density values along with a brine density of 1.05 g/cm³ and a medium density of 2.65 g/cm³, and assuming values of Sg and Soil to obtain a bulk density value rho-B of the formation:

$$\rho_B = \phi \rho_{fgo} + (1 - \phi)\rho_m \quad (62)$$

where rho−fgo=Sg−rho−g+Soil(rho−oil)+(1−S-gas−Soil)rho−br to obtain an equation for velocity with gas and oil present, i.e., to obtain the predicted value of Vp with gas present:

$$\hat{P}_{gas}^* = \rho_B \hat{V}_p^2 \quad (63)$$

In step (7), sonic characteristics of interest are calculated as a function of different gas saturations and compared with actual values until a pattern match occurs. The amount of gas saturation is then evident.

MODIFICATION

Note in Equation 54 that the gas compression is assumed to be an isothermal process.

In the seismic frequency range below 100 hz, and for average pore sizes of about 40 micrometers or so, experience has shown that isothermal compression is probably the most likely. On the other hand, for moderate-size pores in this range, dealing with frequencies on the order of 20 khz, i.e., those frequencies used for acoustic well logs (sonic logs), calculations based upon the inequalities shown by the above experience indicate that the gas compression is most likely adiabatic. Additionally, for intermediate pore size distributions and intermediate frequencies, it is possible to have a certain amount of isothermal and a certain amount of adiabatic compression occurring in the gas trapped in the pores of a rock. Thus, an improvement in the price proprietary techniques as cited in the copending applications, supra, can be had by considering the possibility of having isothermal as well as adiabatic mixture calculations, especially for well logging applications.

The present invention provides such calculation, yet is also capable in addition of making calculations based on an isothermal gas bulk modulus. Briefly, it first calculates the isothermal gas bulk modulus (KISCGAS) as previously done, and then proceeds to evaluate the specific heat of the gas at constant pressure, Cp, and the specific heat of the gas at constant volume, Cv, as well as obtains the specific heat ratio Cp/Cv. Once the Cp/Cv ratio is obtained, the adiabatic gas modulus (KADGAS) can be computed as shown in Equation 58a:

$$KADGAS = (Cp/Cv) \, KISOGAS \quad (58a)$$

Having thus obtained both the isothermal and adiabatic gas bulk moduli, the paramater GASMIX, is input to the program to calculate the gas bulk modulus, Kgas, via the equation set forth below:

$$Kgas = (GASMIX)(KADGAS) + (1 - GASMIX)(KISOGAS) \quad (58a)$$

Inspection of equation 56 shows that when GASMIX=0, the resulting gas bulk modulus is the isothermal value. The default on GASMIX is the isothermal case, i.e., GASMIX=0. However, the user of the present invention can input any GASMIX value between 0 and 1. Taking GASMIX=1 yields the adiabatic value for Kgas, $$\text{Kgas} = \text{KADGAS} \tag{58c}$$

An additional feature of the present invention should be mentioned, and that is that the present invention can be carried out in a digital computer such that the Km, Gm default values can be used when no mineral data are available. Such values can be input by the user. This was not the case in the prior applications supra, where the user was forced to accept the built-in values based on average Km and Gm values computed from laboratory data for sandstones, limestones and dolostones. The new parameters of interest are GASMIX, KMDEF and GMDEF.

Also, the present invention includes the techniques of the prior copending cases as a special case and enables users to apply a particular type of claculating scheme to the analysis of well log data with the objective of applying the results to acoustic and density measurements in another well. All of the original (isothermal) seismic applications still prevail for GASMIX=0. Either compressional velocities or sonic log delta-T's for seismic applications can be input as long as GASMIX=0. It is possible also to have seismic inputs, if these are available, and use them to assist formation evaluation in a logged well. The possibilities are now: (1) seismic to seismic; (2) well logs to seismic; (3) well logs to well logs; and finally (4) seismic to well logs.

Now in more detail, the present invention sets forth the following calculations for elastic moduli of gases under adiabatic conditions.

Calculations of Cp and Cv for natural gas:

$$C_p - C_v = -T\left(\frac{\partial p}{\partial T}\right)_V^2 / \left(\frac{\partial p}{\partial V}\right)_T \tag{A1}$$

where Cp and Cv are the specific heats of the natural gas at constant pressure and at constant volume respectively in Btu/lb °Rankine. Also, p, V and T are the pressure, temperature and volume. If TpC and Ppc are the pseudo-critical temperatures and pressures, the following equations result:

$$\left.\begin{array}{l} T = Tpc\ Tpr \\ P = Ppc\ Ppr \\ V = R_o \dfrac{Tpc\ Vpr}{Ppc} \end{array}\right\} \tag{A2}$$

where Tpr, Ppr and Vpr are then then-calculable pseudo-reduced temperature, pressure and volume. Now at a certain point in the present invention, all the pseudo-reduced quantities have been coputed (they are dimensionless).

Placing (A2) into (A1) yields the result $$C_p - C_v = R_o\left[-Tpr\left(\frac{\partial Ppr}{\partial Tpr}\right)_{Vpr}^2 / \left(\frac{\partial Ppr}{\partial Vpr}\right)_{Tpr}\right] \tag{A3}$$

where the bracketed quantity on the right is simply a pseudo-reduced version of Cp-Cv, namely the computable quantity $$Cpr - Cvr = -Tpr\left(\frac{\partial Ppr}{\partial Tpr}\right)_{Vpr}^2 / \left(\frac{\partial Ppr}{\partial Vpr}\right)_{Tpr} \tag{A4}$$

In (A2) and (A3), $R_o$ is the gas constant with units and dimensions, $$R_o = 1.987 \text{ BTU/lb. mol °Rankine TM} \tag{A5}$$

Hence, placing (A4) in (A3) we get simply $$C_p = C_v + R_o(Cpr - Cyr) \tag{A6}$$

The problem is then to compute Cpr-Cvr and also Cv so that Cp can be computed and hence the all-important Cp/Cv ratio.

The present invention has previously solved the Benedict-Webb-Rubin equations 54 and 55 in pseudo-reduced form for X where $$X - 1/Vpr \tag{A7}$$

is the reciprocal of the pseudo-reduced volume, Vpr.

In addition, an isothermal pseudo-reduced gas bulk modulus Kisord has been computed from the relation $$K_{isord} = -Vpr\left(\frac{Ppr}{Vpr}\right)_{Tpr} \tag{A8}$$

Hence, the denominator of (A4) is thus given by the product, $$\left(\frac{\partial Ppr}{\partial Vpr}\right) = -X\ K_{isord} \tag{A9}$$

and is thus known at this point in the method of the present invention. It remains to compute $$\left(\frac{\partial Ppr}{\partial Tpr}\right)_{Vpr}$$

in the numberator of (A4).

Note that:

$$\left(\frac{\partial Ppr}{\partial Tpr}\right)_{Vpr} = X + Q_1X^2 + brX^3 - \frac{2X^3}{Tpr^3}Cr(1 - \gamma rX^2)e^{-\gamma rX^2} \tag{A10}$$

where $$Q_1 = Bor + 2Cor/Tpr^3 \tag{A11}$$

and the pseudo-reduced B-W-R coefficients Bor, Cor, Cr, gamma-r, br, etc., are given and known from Table A below:

TABLE A

Coefficients for the Reduced Benedict-Webb-Rubin Equation of State for Natural Gas

| Coefficient | Ppr from 0.4 to 5.0 | Ppr from 5.0 to 15.0 |
|---|---|---|
| ar | 0.001290236 | 0.0014507882 |
| Aor | 0.38193005 | 0.37922269 |
| br | 0.022199287 | 0.024181399 |
| Bor | 0.12215481 | 0.11812287 |
| Cr | −0.015674794 | 0.037905663 |
| Cor | 0.027271364 | 0.19845016 |
| alpha-r | 0.023834219 | 0.048911693 |
| gamma-r | 0.43617780 | 0.0631425417 |

Thus, from (A11), Table A, (A10) and (A4) we see that the numerator (A4) can be calculated, since X, Tpr, Ppr, and the pseudo-reduced coefficients are known. This enables Cpr-Cvr for use in (A6) to be calculated.

It remains to calculate Cv in (A6), and this can be done as follows. Table B below, for known pseudo-critical Tpc, Ppc, the quantities a, Ao, B, Bo, C, Co, alpha and gamma can be calculated. These are then used in the following equation, viz:

$$C_v = C_v^o + \frac{6}{T^3 V_m}\left[C_o - \frac{cV_m}{\gamma} + \frac{cV_m}{\gamma}e^{-\gamma/V_m^2} + \frac{ce^{-\gamma/V_m^2}}{2V_m}\right] \quad (A12)$$

to compute Cv.

In (A12), T is the known Rankine temperature prevailing and Vm is the molar volume provided the solar gas constant Rm given by $$Rm = 10.73 = psi\ cu.ft/lb\ mol\ °R) \quad (A13)$$

The result of (A13 is used in the equations (A17)-(A24) of Table B below.

In (A12), Cvo is the low-pressure heat capacity at constant volume given by (A26), namely $$C_v^o = C_p^o - R_o \quad (A14)$$

where Ro is given by (A5) and Cpo is given by (A27), namely $$C_p^o = A + BT_f + CG + DG^2 + E(T_fG) + FT_f^2 \quad (A15)$$

In (A15), Tf is the known Fahrenheit temperature and G is the known API gas gravity. The constants A, B, C, D, E and F are given in Table C below, i.e.,

TABLE C

Coefficients for the Correlation of Low-Pressure Isobaric Heat Capacity for Natural Gas As Function of Temperature and Gravity

| Temperature Range | | |
|---|---|---|
| 0 to 200° F. | 0 to 600° F. | Units |
| 4.6435 | 3.7771 | T: °F. = Tf |
| −0.0079997 | −0.0011050 | Cpo: Btu/lb mol °F. |
| 5.8425 | 7.5281 | |
| 1.1533 | 0.65621 | |
| 0.020603 | 0.014609 | |
| 9.849 (10⁻⁶) | 0.0 | |

In the method, both the 0°–200° F. and 0°–600° F. range values of Table C are used when appropriate. Thus, the sequence is to get Cpo from (A15), use it in (A14) to get Cvo; use Cvo (in (A12) to get Cv. Then having Cpr-Cvr and Cv, use (A6) to compute Cp. Thus, Cp/Cv is obtained for use in Equation 58a.

Below in Table B is a list of relevant equations:

TABLE B

| | |
|---|---|
| $a = arR^3Tpc^3/Ppc^2$ | (A17) |
| $Ao = AorR^2Tpc^2/Ppc$ | (A18) |
| $b = brR^2Tpc^2/Ppc^2$ | (A19) |
| $Bo = Bor\ RTpc/Ppc$ | (A20) |
| $c = crR^3Tpc^5/Ppc^2$ | (A21) |
| $Co = Cor\ R^2Tpc^4/Ppc$ | (A12) |
| $alpha = alpha\text{-}r\ R^3Tpc^3/Ppc^3$ | (A23) |
| $gamma = gamma\text{-}r\ R^2Tpc^2/Ppc^2$ | (A24) |

In Table D below, some computed values of Cp/Cv for methane, "ethane" and "butane" for a variety of pressures and temperatures are illustrated.

TABLE D

| Depth (ft) | Fluid Pressure (psi) | Temp. °F. | Gas | Gas Gravity = G | Cp/Cv |
|---|---|---|---|---|---|
| 2,000 | 930 | 104 | Methane | 0.554 | 1.421 |
| 4,000 | 1860 | 134 | Methane | 0.554 | 1.501 |
| 10,000 | 4650 | 224 | Methane | 0.554 | 1.473 |
| 2,000 | 930 | 104 | "Ethane" | 1.0 | 1.672 |
| 4,000 | 1860 | 134 | "Ethane" | 1.0 | 1.795 |
| 10,000 | 4650 | 224 | "Ethane" | 1.0 | 1.289 |
| 2,000 | 930 | 104 | "Butane" | 2.0 | 1.081 |
| 4,000 | 1860 | 134 | "Butane" | 2.0 | 1.081 |
| 10,000 | 4650 | 224 | "Butane" | 2.0 | 1.066 |

DESCRIPTION OF EMBODIMENT

Having now established a firm mathematical and theoretical basis for the process of the present invention, perhaps a description for a system for carrying out the invention is in order. In this regard, reference again should be made to FIG. 3, which is a flow diagram for such a system. From the above descriptions, it is evident that displays ultimately will be provided which indicate both presence and amounts of gas/oil-bearing strata within a zone of interest.

It should be pointed out that while theoretical acoustic characteristics can be provided using the expressions and descriptions set forth above, actual acoustic data must be available from the field: such data are initially collected, say, using one of today's conventional well-logging techniques, e.g., those providing sonic velocity values. From such data, characteristics of events of the logs associated with gas/oil-bearing strata can be normalized and then compared with the theoretical data predicted by the method involving the present invention, such values being variable as a function of gas/oil saturation, inter alia.

Note futher in returning to FIG. 3 that it can be assumed that a section of the log has been analyzed for hydrocarbon potential, say, a gas-bearing strata alone, such events being known by geographic location and depth basis.

The steps of FIG. 3 include calculation of synthetic acoustic values of interest, as a function of gas saturation, and comparing these values with actual field logging values obtained using conventional sonic logs in the new well of interest.

Such comparison will include calculations of the theoretical data values as a function of ga/oil saturation; then the pattern of such values as a function of gas/oil saturation can be analyzed so that an interpreter can compare actual logged data therewith and therefore estimate the gas/oil saturation in the zone of interest.

COMPARISON TECHNIQUES

The comparison of such values can occur within (or without) the particular computing system to be adopted. If internal comparison techniques are used, the nature of the results (to be equated in a comparison sense) must be taken into account:

(i) for velocity comparisons, an array comparison technique can be used within the system to be adopted in which dimensions of the array include: Velocity amplitudes (both synthetic and actual) as a function of geometrical location, depth values, and gas/oil saturation.

While either the synthetic or actual values can serve as the primary selector values, it is perhaps better to use the latter to compare with the former. In that way, the array addresses associated with individual velocity values can be incremented in sequence (in one or more dimensions) and the results compared. The best match becomes apparent from a reading or listing of all comparisons made, or from a designation of the best match on a GO-NO GO basis. In this regard, some preliminary processing analysis of the semismic record is in order to establish the active seismic velocity deducible from the record as a function of depth. A technique well known in the art to reconcile theory and data, uses an iterative technique in which a sonic velocity for a set of logs is associated, and coherency of the data noted. Then the process is repeated with a different sonic velocity; the most coherent of the data allows a "best" sonic velocity determination to be deduced.

(ii) for amplitude comparisons, an array technique similar to that previously described can be used; but conversely an auxiliary comparitor could also be implemented to function with disk data provided from the computing system to be described hereinafter. In the former, dimensions of the array would include: actual and synthetic amplitude values as a function of geometrical location, depth values and gas/oil saturation values. Incrementing of the array (in one or more dimensions) allows for a determination of "best" match of the data. In the latter, "best" match statistics can be developed, including cross-correlation techniques.

Figure 4:
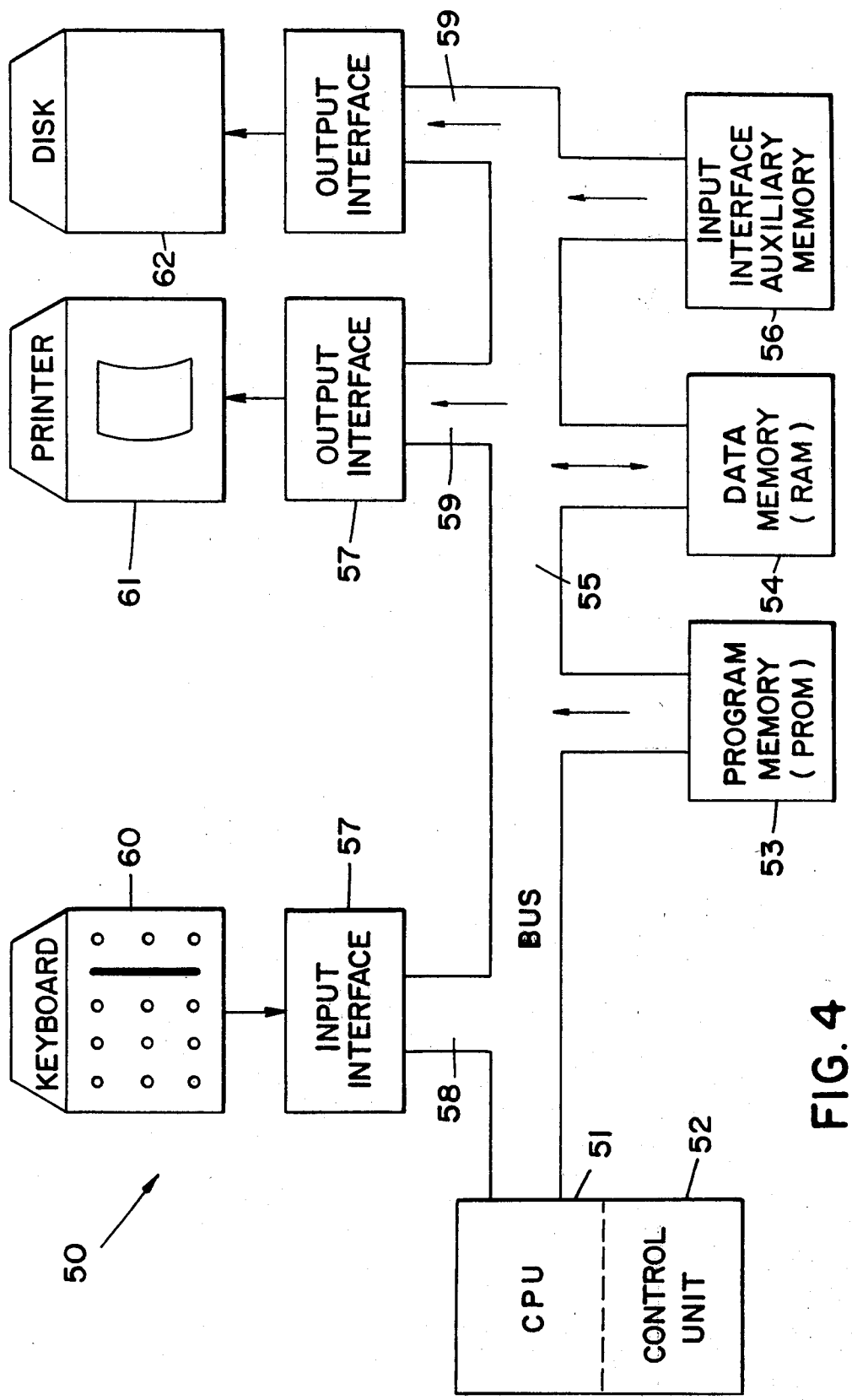
FIGS. 4 and 5 are schematic diagrams of elements within the digital computing system of FIG. 3.

FIG. 4 illustrates particular elements of a computing system for carrying out the steps of FIG. 3, including certain aspects related to the comparison of data.

THE SYSTEM

While many computing systems are available to carry out the process of the present invention, to best illustrate operations a microcomputing system 50 of FIG. 4 is didactically best and is presented in detail below.

System 50 of FIG. 4 can be implemented on hardware provided by many different manufacturers, and for this purpose elements provided by MOS Technology, Norristown, Pa. 19401, may be preferred.

Such a system 50, which can be an MCS-6500 system from the above corporation, can include a CPU 51 controlled by a control unit 52 in conjunction with signals from external devices (one or more), not shown. Two memory units 53 and 54 connect to CPU 51 through bus 55. Program memory unit 53 (ROM) stores instructions for directing the activities of the CPU 51, while data memory 54 (RAM) contains data as data words related to logging and other geologic data provided by field acquisition systems. Since the logging and geologic data banks comprise large amounts of big-bit data, an auxiliary memory unit 56 may also be useful in carrying out the method of the present invention. Inputting and accessing such information is usually via peripheral interfaces 57. To rapidly input or access data, the CPU 51 addresses a particular port (say at input port 58, output ports 59). Such ports are addressed to receive or access information as required, such information being fed say via keyboard 60 or outputted or storable on usual external equipment known in the art, e.g., printer 61, floppy disks 62, paper-tape readers, etc.

The number and type of peripheral devices needed to carry out the method of the invention can generally be estimated very accurately. However, it is important to keep in mind that such estimates must be subject to review after a full analysis of system performance is completed. The seismic-interprater-designer may find it necessary to use a special-purpose interface part or to redesign the I/O structure if the evaluation of total system performance reveals that the system performance reveals that the system cannot operate at the required speed. Use of special-purpose peripheral interface parts will reduce the number of tasks which must be handled by the CPU 51 and consequently can increase the over-all system speed, but this generally involves additional component cost.

Likewise, the use of a fully vectored interrupt can lead to increased performance at increased cost. The goal of any program must be to meet all the system performance at the minimum possible cost.

After the various peripheral devices in the sytem have been evaluated to determine the number of inputs and outputs required, the total required by all peripherals can be divided by 16 to determine the number of devices required. This is a good first approximation which will be reevaluated as the system development progresses.

Evaluation of the amount of RAM required by the system is a somewhat more difficult problem than estimation of peripheral devices. This is due primarily to the fact that such of the RAM is required by the system software as working storage, such as storage of immediate results in arithmetic operations. Since the machine-implemented program will probably not be written when these estimates are first attempted, the probability of error in this portion of the estimate may be fairly high.

In addition to working storage, the RAM must provide storage for:

1. The Stack (to be described below);
2. Peripheral input data storage;
3. Peripheral output data storage.

Items 2 and 3, above, can be evaluated quite accurately, since a detailed analysis of the peripheral devices has usually been completed when these estimates are first attempted. In general, a block of RAM must be made availble for each peripheral device. The amount of RAM required for each is a function of the type of peripheral device being interfaced and just how the device is to be controlled.

The amount of RAM required by the stack is a function of both the interrupt structure and the system software. As a result, an estimate of this requirement must be based on the system programmer's best estimates of his requirements. This should be combined with an estimate of the required working storage and the peripheral data storage requirements to obtain an estimate of the total system RAM.

Amount of ROM required in a system cannot be determined accurately until the system program is completed. However, by partitioning the system program into definable pieces, an estimate can be made of each task and the total can be obtained of the ROM required by each section.

Most programs consist of easily defined sections such as the software for each peripheral device, arithmetic routines, etc. These are the pieces which should be examined separately to estimate the ROM required by each.

For outputting information, system 50 can be included with printer 61, again accessed through a particular interface 57 at an output port 59, whereby the operations in accordance with the present invention are printable. Of more use as an outputting unit, however, would be a disk unit which would temporarily store the accumulated data after the latter had again been accessed through a different interface 57 at another output port 59. In that way, the information on the disk unit can be used in conjunction with an off-line digital plotter capable of generating proper side-by-side displays of the data for use in conjunction with typical seismic data sections for comparisons and interpretation, as explained below. Such plotters are available in the art. One proprietary model that we are familiar with uses a computer-controlled CRT for optically merging onto photographic paper as a display mechanism the data provided by the present invention. Briefly, in such a plotter, the data are converted to CRT deflection signals; the resulting beam is drawn on the face of the CRT and the optically merged record of the events recorded, say via photographic film. After a predetermined number of side-by-side lines have been drawn, the film is processed in a photography laboratory and hard copies returned to the interpreters for their review.

Of course, the CPU 51 of FIG. 4 is the key to the operation in accordance with the present invention. As a general matter, it controls the functions performed by the other components, including addressing all input and output ports. It also fetches instructions from program memory unit 53, decodes their binary content and executes them. It also references data memory unit 54 (and/or other auxiliary memory units) and other interface ports as required in the execution of the instructions. It also recognizes and responds to certain control signals as set forth below.

Figure 5:
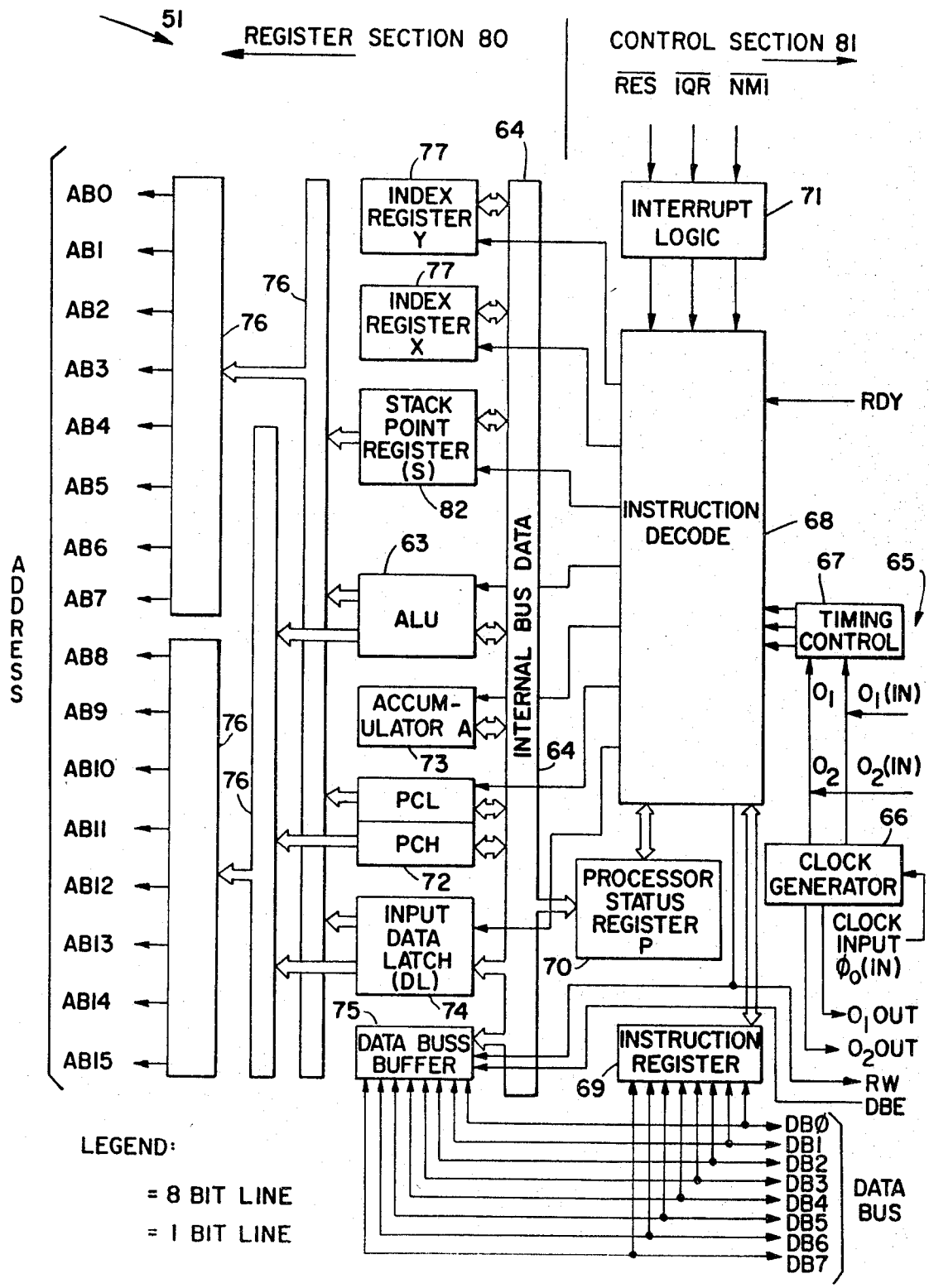

FIG. 5 illustrates CPU 51 in more detail.

As shown, the CPU 51 includes an array of registers surrounding but operatively tied to an arithmetic logic unit (ALU) 63 through an internal data bus 64, all under control of a control unit generally indicated at 65. As indicated, the control unit includes clock generator 66, timing control unit 67 and instruction decoder 68. Note that the instruction decoder 68 is also operatively timed to the following units for control purposes: an instruction register 69, processor status register 70 and interrupt logic circuit 71, operating as set forth below. While instruction register 69 and program counters 72 have dedicated uses, an array of other registers, such as accumulator 73 and index registers 77 have more general uses.

The accumulator 73 usually stores one of the seismic operands to be manipulated by the ALU 63. E.g., in the summation of two or more numbers, the instruction may direct the ALU 63 to not only add in sequence the contents of the temporary registers containing predetermined values of logging or geologic data in the accumulator, but also store the result in the accumulator itself. Hence the accumulator 73 operates as both a source (operand) and a destination (result) register. Additional registers such as input data latch 74, data bus buffer 75 and address latches and buffers 76 are useful in manipulation of other seismic results and data, since they eliminate the need to shuffle results back and forth between the external memory units of FIG. 4 and accumulator 73.

The internal organization of the CPU 51 can be split into two sections. In general, the instructions obtained from the program memory 54 (FIG. 4) are executed by implementing a series of data transfers in the register section indicated at 80. The control lines which actually cause the data transfers to take place are generated in the control section generally indicated at 81. Instructions enter the CPU 51 on the bus 55 (FIG. 4), are latched into instruction register 69 and are then decoded along with timing signals at instruction decoder 68 to generate the register control signals to the various other elements of the system.

The control unit 65, including timing controller 67, keeps track of the specific cycle being executed. These units are set to "T0" for each instruction fetch cycle and are advanced at the beginning of each "Phase One" clock pulse. Each instruction starts in T0 and goes to T1, T2, T3, etc., for as many cycles as are required to complete execution of the instruction. Each data transfer, etc., which takes place in the register section 80 is caused by decoding the contents of both the instruction register 69 and the timing control unit 65.

Additional control lines which affect the execution of the instructions are derived from the interrupt logic unit 71 and from the process status register 70. The interrupt logic unit 71 controls the CPU interface to the interrupt inputs to assure proper timing, enabling, sequencing, etc., which the CPU 51 recognizes and services.

The processor status register 70 also can contain a set of latches which serve to control certain aspects of the CPU operation, say to indicate the results of CPU arithmetic and logic operations, and to indicate the status of data either generated by the CPU or transferred into the CPU from outside.

Since the real work of the CPU is carried on in the register section 80 of the CPU, perhaps a detailed study is in order. The components of section 80 include:
Data Bus Buffers 75
Input Data Latch (DL) 74
Program Counter (PCL, PCH) 72
Accumulator (A) 73
Arithmetic Logic Unit (ALU) 63
Stack Pointer (S) 82
Index Registers (X, Y) 77
Address Bus Latches/Buffers 76
Process Status Register (P) 70

Again referring to FIG. 4, at 1 mHz the data which come into the CPU from the program memory 54, the data memory 53 or from peripheral devices appears on the bus 55 during the last 100 nanoseconds of Phase Two. No attempt is made to actually operate on the data during this short period. Instead, it is simply transferred into the input data latch 74 (FIG. 5) for use during the next cycle. The data latch 74 serves to trap the data on the bus during each Phase Two pulse. It can then be transferred onto one of the internal buses, say bus 64, and from there into one of the internal registers. For example, data being transferred from memory into the accumulator 73 will be placed on the internal data bus 64 and will then be transferred from the internal data bus 64 into the accumulator 73. If an arithmetic or logic operation is to be performed, say using the data from a memory unit and the contents of the accumulator 73, data in the input data latch 74 will be transferred onto the internal data bus 64 as before. From there, it will be transferred into the ALU 63. At the same time, the contents of the accumulator 73 will be transferred onto a bus in the register section 80 and from there into the second input to the ALU 63. The results of the arithmetic or logic operation will be transferred back to the accumulator 73 on the next cycle by transferring first onto the bus and then into the accumulator 73. All of these data transfers take place during the Phase One clock pulse.

The program counter (PCL, PCH) 72 provides the addresses which step the CPU through sequential instructions to the program. Each time the CPU fetches an instruction from program memory, the contents of PCL 72 are placed on the low-order 8 bits of the address bus and the contents of PCH 72 are placed on the high-order 8 bits. The counter 72 is incremented each time an instruction or data is fetched from program memory.

Accumulator 73 is a general-purpose 8-bit register which stores the results of most arithmetic and logic operations. In addition, the accumulator 73 usually contains one of the two data words used in these operations.

All logic and arithmetic operations take place in the ALU 63. This includes incrementing and decrementing of internal registers (except PCL and PCH 72). However, the ALU 63 cannot store data for more than one cycle. If data are placed on the inputs to the ALU 63 at the beginning of one cycle, the result is always gated into one of the storage registers or to external memory during the next cycle. Each bit of the ALU 63 has two inputs. These inputs can be tied to various internal buses or to a logic zero; the ALU 63 then generates the SUM, AND, OR, etc., function using the data on the two inputs.

Stack pointer (S) 82 and the two index registers (X and Y) 77 each consist of 8 simple latches. These registers store data which are to be used in calculating addresses in data memory.

Address bus buffers 76 consist, in part, of a set of latches and PTL compatible drivers. These latches store the addresses which are used in accessing the peripheral devices (ROM, RAM, and I/O's of FIG. 4.

Table VI illustrates the total CPU instructions which must be used to carry out the method of the present invention.

In brief, the CPU instruction set is divided into three basic groups. The first group has the greatest addressing flexibility and consists of the most general-purpose instructions such as Load, Add, Store, etc. The second group includes the Read, Modify, Write instructions such as Shift, Increment, Decrement and the Register X movement instructions. The third group contains all the remaining instructions, including all stack operations, the register Y, compares for X and Y and instructions which do not fit naturally into Group One or Group Two.

There are eight Group One instructions, eight Group Two instructions, and all of the 39 remaining instructions are Group Three instructions.

The three groups are obtained by organizing the OP CODE pattern to give maximum addressing flexibility (16 addressing combinations) to Group One, to give 8 combinations to Group Two instructions and the Group Three instructions are basically individually decoded.

GROUP ONE INSTRUCTIONS

These instructions are: Add with Carry (ADC), (AND), Compare (CMP), Exclusive Or (EOR), Load A (LDA), Or (ORA), Subtract With Carry (SBC), and Store A (STA). Each of these instructions has a potential for 16 addressing modes, although usually in practice only 8 of the available modes are used.

Addressing modes for Group One are: Immediate, Zero Page, Zero Page Indexed by X, Absolute, Absolute Indexed by X, Absolute Indexed by Y, Indexed Indirect, Indirect Indexed. The unused 8 addressing modes are used to allow, possibly, addressing of additional on-chip registers, of on-chip I/O ports, and to allow two-byte word processing.

GROUP TWO INSTRUCTIONS

Group Two instructions are primarily Read, Modify, Write instructions. There are really two subcategories within the Group Two instructions. The components of the first group are shift and rotate instructions and are: Shift Right (LSR), Shift Left (ASL), Rotate Left (RCL), and Rotate Right (ROR).

The second subgroup includes the Increment (INC) and Decrement (DEC) instructions and the two index register X instructions, Load X (LDX) and Store X (STX). These instructions would normally have 8 addressing modes available to them because of the bit pattern. However, to allow for upward expansion, only the following addressing modes have been defined: Zero Page, Zero Page Indexed by X, Absolute, Absolute Indexed by X, and a special Accumulator (or Register) mode. The four shift instructions all have register A operations; the incremented or decremented Load X and Store X instructions also have accumulator modes, although the Increment and Decrement Accumulator has been reserved for other purposes. Load X from A has been assigned its own mnemonic, TAX. Also included in this group are the special functions of Decrement X which is one of the special cases of Store X. Included also in this group in the X decodes are the TXS and TSX instructions.

All group One instructions have all addressing modes available to each instruction. In the case of Group Two instructions, another addressing mode has been added; that of the accumulator and the other special decodes have also been implemented in this basic group. However, the primary function of Group Two instructions is to perform some memory operation using the appropriate index.

It should be noted for documentation purposes that the X instructions have a special mode of addressing in which register Y is used for all indexing operations; thus, instead of Zero Page Indexed by X, X instructions have Zero Page Indexed by Y, and instead of having Absolute Indexed by X, X instructions have Absolute Indexed by Y.

GROUP THREE INSTRUCTIONS

There are really two major classifications of Group Three instructions; the modify Y register instructions, Load Y (LDY), Store Y (STY), Compare Y (CPY), and Compare X (CPX), instructions actually occupy about half of the OP CODE space for the Group Three instructions. Increment X (INX) and Increment Y (INY) are special subsets of the Compare X and Compare Y instructions and all of the branch instructions are in the Group Three instructions.

Instructions in this group consist of all of the branches: BCC, BCS, BEQ, BMI, BNE, BPL, BPC and BPS. All of the flag operations are also devoted to one addressing mode—they are: CLC, SEC, CLD, SED, CLI, SPI and CLV. All of the push-and-pull instructions and stack operation instructions are Group Three instructions. These include: BRK, JSR, PHA, PHP, PLA and PLP. The JMP and BIT instructions are also included in this group. There is no common addressing mode available to members of this group. Load Y, Store Y, BIT, Compare X and Compare Y have Zero Page and Absolute, and all of the Y and X instructions allow Zero Page Indexed operations and Immediate.

Returning to FIG. 4, the total CPU instruction set of Table VII which controls CPU 51 is stored in the program memory unit 53. The CPU 51 references the contents of the memory unit 53 in order to determine appropriate processing steps.

In operations, the addresses of the instruction set, in order, are numerically adjacent, the lower addresses containing the first instructions to be executed and the higher addresses containing later instructions.

The only time the program violates the sequential rule previously mentioned is when the instruction in one section of memory is a "jump" instruction to another section of memory.

A jump instruction can also contain the address of the instruction which is to follow it. The next instruction may be stored in any location in memory unit 53, FIG. 4, as long as the programmed jump specifies the correct address.

A special kind of program jump occurs when the stored program "calls" a subroutine. In this kind of jump, the CPU 51 is required to "remember" the contents of the program counter at the time that the jump occurs. This enables the CPU 51 to resume execution of the main program which it is finished with the last instruction of the subroutine.

A "subroutine" is a program within a program. Usually it is a general-purpose set of instructions that must be executed repeatedly in the course of a main program.

The CPU 51 has a special way of handling subroutines in order to insure an orderly return to the main program. When the CPU receives a call instruction, it increments the program counter and notes the counter's contents in a reserved memory area of the memory unit known as the stack area, which includes stack pointer 82 and index registers 77 of FIG. 5. The stack area thus saves the address of the instruction to be executed after the subroutine is completed. Then the CPU 51 loads the address specified in the call into the program counter 72. The next instruction fetched will therefore be the first step of the subroutine.

The last instruction in any subroutine is a "return". Such an instruction need specify no address. When the CPU 51 fetches a return instruction, it simply replaces the current contents of the program counter with the address on the top of the stack. This causes the CPU 51 to resume execution of the calling program at the point immediately following the original call instruction.

Subroutines are often "nested", that is, one subroutine will sometimes call a second subroutine. The second may call a third, and so on. This is perfectly acceptable, as long as CPU 51 has enough capacity to store the necessary return addresses, and the logical provision for doing so. In other words, the maximum depth of nesting is determined by the depth of the stack. If the stack has space for storing three return addresses, then three levels of subroutines may be accomplished.

CPU's have different ways of maintaining stack contents. Some have facilities for the storage of return addresses built into the CPU itself. Other CPU's use a reserved area of external memory as the stack area and simply maintain a stack "pointer" register, such as pointer register 82, FIG. 6, which contains the address of the most recent stack entry. The external stack hence allows virtually unlimited subroutine nesting. In addition, if the processor provides instructions that cause the contents of the accumulator 73 and other general-purpose registers to be "pushed" onto the stack or "pulled" off the stack via the address stored in the stack pointer 82, multi-level interrupt processing (as described later) is possible. The status of CPU 51 (i.e., contents of all the registers) can be saved in the stack when an interrupt is accepted and then restored after the interrupt has been serviced. This ability to save the CPU's status at any given time is possible, even if an interrupt service routine itself is interrupted.

Each operation that the CPU can perform is identified by a unique byte of data known as an "operation code". An 8-bit word used as an operation code can distinguish between 256 alternative actions, more than adequate for most processors.

In general, all instructions begin with T0 and the fetch of the OP CODE and continue through the required number of cycles until the next T0 and the fetch of the next OP CODE. Basic terminology used in conjunction with the Figures and is as defined below, for ease of reference.

OP CODE—The first byte of the instruction containing the operator and mode of address.

OPERAND—The data on which the operation specified in the OP CODE is performed.

BASE ADDRESS—The address in Indexed addressing modes which specifies the location in memory to which indexing is referenced. The high order of byte of the base address (AB08 to AB15) is BAH (Base Address High) and the low order of the base address (AB00 to AB07) is BAL (Base Address Low).

EFFECTIVE ADDRESS—The destination in memory in which the data are to be found. The effective address may be loaded directly as in the case of page Zero and Absolute Addressing or may be calculated as in Indexing operations. The high order byte of the effective address (AB08 to AB15) is ADH and the low order byte of the effective address (AB00 to AB07) is ADL.

INDIRECT ADDRESS—The address found in the operand of instructions utilizing (Indirect), Y which contains the low order byte of the base address. IAH and IAL represent the high and low order bytes.

JUMP ADDRESS—The value to be loaded into Program Counter as a result of a Jump Instruction.

During operation, the CPU 51 fetches an instruction in two distinct operations. First, CPU 51 transmits the address in its program counter 72 of FIG. 6 to the memory. Then the memory returns the addressed byte to CPU 51, viz, to the instruction decoder 68, and uses it to direct activities during the remainder of the execution.

The mechanism by which the CPU translates an operation code into specific processing actions requires some elaboration. The 8 bits stored in the instruction decoder 68 can be decoded and used to selectively activate one of a number of output lines, in this case up to 256 lines. Each line represents a set of activities associated with execution of a particular operation code. The enabled line can be combined with selected timing pulses, to develop electrical signals that can then be used to initiate specific actions. This translation of code into action is also aided by the control circuitry associated therewith, as previously explained.

An 8-bit operation code is often sufficient to specify a particular processing action. There are times, however, when execution of the instruction requires more information than 8 bits can convey, e.g., say when the instruction references a memory location. The basic instruction code identifies the operation to be performed, but cannot specify the object address as well. In a case such as this, a 2- or 3-byte instruction must be used. Successive instruction bytes are stored in sequentially adjacent memory locations, and the CPU performs two or three fetches in succession to obtain the full instruction. The first byte retrieved from memory is placed in the CPU's instruction 66 and subsequent bytes are placed in temporary storage; the CPU then proceeds with the execution phase.

CPU 51 usually uses register-pairs to hold the address of a memory location that is to be accessed for data. If the address register is programmable (i.e., if there are instructions that allow the programmer to alter the contents of the register), the program can "build" an address in the address register prior to executing a memory reference instruction (i.e., and instruction that reads data from memory, writes data to memory or operates on data stored in memory).

ALU 63, as previously mentioned, is that portion of the CPU performing the arithmetical and logical operations on the binary data.

The ALU 63 must contain an adder which is capable of combining the contents of registers of array, the register of the CPU and accumulator 73 in accordance with the logic of binary arithmetic. This provision permits the CPU to perform arithmetical manipulations on the data it obtains from memory and from its other inputs.

Using only the basic adder, routines can subtract, multiply and divide, giving the machine complete arithmetical capabilities. In practice, however, most ALU's provide other built-in functions, including hardware subtraction, boolean logic operations and shift capabilities in conjunction with index registers 77.

As previously indicated, interrupt provisions are included on many central processors as a means of improving the CPU's efficiency. Consider the case of a computer that is processing a large volume of data, portions of which are to be output to a printer. The CPU 51 can output a byte of data within a single machine cycle, but it may take the printer the equivalent of many machine cycles to actually print the character specified by the data byte. The CPU 51 could then remain idle, waiting until the printer can accept the next data byte. If an interrupt capability is implemented to the computer, the CPU can output a data byte, then return to data processing. When the printer is ready to accept the next data byte, it can request an interrupt. When the CPU 51 acknowledges the interrupt, it suspends main program execution and automatically branches to a routine that will output the next data byte. After the byte is output, the CPU 51 continues with main program execution. Note that this is, in principle, quite similar to a subroutine call, except that the jump is initiated externally rather than by the program.

More complex interrupt structures are possible, in which several interrupting devices share the same processor but have different priority levels. Interruptive processing is an important feature that enables maximum utilization of a processor's capacity for high system throughput.

Another important feature that improves the throughput of a CPU is the hold. The hold provision enables direct memory access (DMA) operations.

In ordinary input and output operations, the CPU 51 supervises the entire data transfer. Information to be placed in memory is transferred from the input device to the CPU, and then from the CPU to the designated memory location. In similar fashion, information that goes from memory to output devices goes by way of the CPU.

Some peripheral devices, however, are capable of transferring information to and from memory much faster than the CPU itself can accomplish the transfer. If any appreciable quantity of data must be transferred to or from such a device, then system throughput will be increased by having the device accomplish the transfer directly. The CPU 51 must temporarily suspend its operation during such a transfer, to prevent conflicts that would arise if the CPU and peripheral device attempted to access memory simultaneously. It is for this reason that a hold provision is provided.

TABLE VI

Summary of Processor Instructions by Hexadecimal Sequence

| Hexadecimal | Mnemonic |
| --- | --- |
| 00 | BRK |
| 01 | ORA - (Indirect,X) |
| 05 | ORA - Zero Page |
| 06 | ASL - Zero Page |
| 08 | PHP |
| 09 | ORA - Immediate |
| 0A | ASL - Accumulator |
| 0D | ORA - Absolute |
| 0E | ASL - Absolute |
| 10 | BPL |
| 11 | ORA - (Indirect),Y |
| 15 | ORA - Zero Page,X |
| 18 | CLC |
| 19 | ORA - Absolute,Y |
| 1D | ORA - Absolute,X |
| 1E | ASL - Absolute,X |
| 20 | JSR |
| 21 | AND - (Indirect,X) |
| 24 | BIT - Zero Page |
| 25 | AND - Zero Page |
| 26 | ROL - Zero Page |
| 28 | PLP |
| 29 | AND - Immediate |
| 2A | ROL - Accumulator |
| 2C | BIT - Absolute |
| 2E | ROL - Absolute |
| 30 | BMI |
| 31 | AND - (Indirect),Y |
| 35 | AND - Zero Page,X |
| 36 | ROL - Zero Page,X |
| 38 | SEC |
| 39 | AND - Absolute,Y |
| 3D | AND - Absolute,X |
| 3E | ROL - Absolute,X |
| 40 | RTI |
| 41 | EOR - (Indirect,X) |
| 45 | EOR - Zero Page |
| 46 | LSR - Zero Page |
| 48 | PHA |
| 68 | PLA |
| 69 | ADC - Immediate |
| 6A | ROR - Accumulator |
| 6C | JMP - Indirect |
| 6D | ADC - Absolute |
| 6E | ROR - Absolute |
| 70 | EVS |

TABLE VI-continued
Summary of Processor Instructions by Hexadecimal Sequence

| Hexadecimal | Mnemonic |
|---|---|
| 71 | ADC - (Indirect),Y |
| 75 | ADC - Zero Page,X |
| 76 | ROR - Zero Page,X |
| 78 | SEI |
| 79 | ADC - Absolute,Y |
| 7D | ADC - Absolute,X |
| 7E | ROR - Absolute,X |
| 81 | STA - (Indirect,X) |
| 84 | STY - Zero Page |
| 85 | STA - Zero Page |
| 86 | STX - Zero Page |
| 88 | DEY |
| 8A | TXA |
| 8C | STY - Absolute |
| 8D | STA - Absolute |
| 8E | STX - Absolute |
| 9∅ | BCC |
| 91 | STA - (Indirect),Y |
| 94 | STY - Zero Page,X |
| 95 | STA - Zero Page,Y |
| 98 | TYA |
| 99 | STA - Absolute,Y |
| 9A | TXS |
| 9D | STA - Absolute,X |
| A∅ | LDY - Immediate |
| A1 | LDA - (Indirect,X) |
| A2 | LDX - Immediate |
| A4 | LDY - Zero Page |
| A5 | LDA - Zero Page |
| A6 | LDX - Zero Page |
| A8 | TAY |
| A9 | LDA - Immediate |
| AA | TAX |
| AC | LDY - Absolute |
| AD | LDA - Absolute |
| AE | LDX - Absolute |
| B∅ | BCS |
| B1 | LDA - (Indirect),Y |
| B4 | LDY - Zero Page,X |
| B5 | LDA - Indirect,X |
| B6 | LDX - Indirect,Y |
| B8 | CLV |
| B9 | LDA - Absolute,Y |
| BA | TSX |
| BC | LDY - Absolute,X |
| BD | LDA - Absolute,X |
| BE | LDX - Absolute,Y |
| C∅ | CPY - Immediate |
| C1 | CMP - (Indirect,X) |
| C4 | CPY - Zero Page |
| C5 | CMP - Zero Page |
| C6 | DEC - Zero Page |
| C8 | INY |
| C9 | CMP - Immediate |
| CA | DEX |
| CC | CPY - Absolute |
| CD | CMP - Absolute |
| CE | DEC - Absolute |
| D∅ | RNE |
| D1 | CMP - (Indirect),Y |
| D5 | CMP - Zero Page,X |
| D6 | DEC - Zero Page,X |
| D8 | CLD |
| D9 | CMP - Absolute,Y |
| DD | CMP - Absolute,X |
| DE | DEC - Absolute,X |
| E∅ | CPX - Immediate |
| E1 | SBC - (Indirect,X) |
| E4 | CPX - Zero Page |
| E5 | SBC - Zero Page |
| E6 | INC - Zero Page |
| E8 | INX |
| E9 | SBC - Immediate |
| EA | NOP |
| EC | CPX - Absolute |
| ED | SBC - Absolute |
| EE | INC - Absolute |
| F∅ | BEQ |
| F1 | SBC - (Indirect),Y |
| F5 | SBC - Zero Page,X |
| F6 | IQC - Zero Page,X |
| F8 | SED |
| F9 | SBC - Absolute,Y |
| FD | SBC - Absolute,X |
| FE | INC - Absolute,X |

To repeat, in estimating gas-liquid saturation effects in sands or sandstones having any degree of consolidation, inputting only compressional-wave velocity, density and porosity is all that is required in order to provide estimates of the compression (or bulk) moduli, $K^*$, of fluid-saturated sands; the compression moduli, $Ka$, of sands with empty pores (or with pore-fluid pressures held constant $Kfc = K^* - Ka$; and the shear moduli, $G^*$ of fluid-saturated sands (or $Ga$, of empty sands).

And for an isotropic and homogeneous medium, the velocity, density and moduli are as related above:

$$\rho_B V_p^2 = P^* = K^* + (4/3)G^* \tag{18}$$

$$\rho_B V_s^2 = G^* \tag{19}$$

where rho-B is the bulk density of the formation.

If both compressional- and shear-wave velocities are known, of course, Equation 18 gives $K^*$ directly. But no shear-wave logs exist for most basins under study; furthermore, if they exist, the results are unreliable in loose (unconsolidated) sands.

For convenience and brevity, a program listing has been formulated to ease the solution of the above equations, including calculation of elastic moduli of gases in pseudo-reduced form and preferably under adiabatic conditions, and is set forth below in the Appendix. In such listing, several lower-case symbols will represent dimensionless ratios of moduli where $a = Ka/Km$, $b = K^*/Km$, $g + G^*/Gm = Ga/Gm$, and $F = (Km/Kf) - 1$.

Gassmann's equations 18 and 20d can be modified:

$$\rho_B V_p^2 = P^* = bK_m + (4/3g)G_m \tag{18}$$

$$(K^* - K_a)/K_m = K_f/K_m = b - a = \tag{20d}$$

$$\frac{(1-a)^2}{f\phi + (1-a)} = \frac{(1-b)^2}{f\phi - (1-b)}$$

Additionally, an acceptable empirical relationship between the a and g dimensionless ratios includes:

$$a - g = f_3(c, a+g) \tag{63}$$

where c is an adjustable parameter, a and g are as defined above, and $f_3$ is a functional operator.

The program also computes fluid effects Kf in limestone, sandstone or dolostone formations in which the saturants can be oil (of any gravity), gas (of any gravity), brine, or a combination of all of the above. The resulting output of the program then is the best estimate of seismic velocities and densities as a function of the assumed saturants. Needed input data are depth, pressure gradient, temperature gradient, compressional velocity, Vp (from a sonic log), porosity, $\phi$, bulk density, rho-B, and lithology. Detailed mineralogy is desirable, but not necessary. Note that the user first assumes a gas-oil-brine saturation; an expected compressional velocity Vp, shear velocity Vs, and Poisson's ratio, sigma*, are computed for the formation in the extrapolated region adjacent the well bore. Then velocities can be modeled as a function of gas-oil saturations, for any gravity liquid or gas. Shear wave data are not necessary to use the technique of the present invention. Section A of the listing of the program indicates that the comment statements of the program are quire complete. They describe the meaning of the different symbols used in the program, the method of inputting data to the program and references to the literature relevant to the theory of operation.

Much of the data are built into the program by means of such declarative statements. The inputs are also exhibited in the early part of the program listing.

Briefly, in operation, after reading in the parameter cards and sample cards and possibly mineral cards, the program proceeds to a main compute loop.

Section B illustrates the main part of the program. Note that the compute loop calculates the quantities needed to make the Biot-Gassman fluid corrections to the bulk modulus as a function of gas saturation and oil saturation. Note that the user can indicate lithology, i.e., sandstone, limestone and dolostone lithologies. Furthermore, it does not obtain the gas bulk modulus for methane only, but uses the complete Benedict-Webb-Rubin non-ideal gas law in pseudo-reduced form to calculate both gas modulus and the gas density. Surprisingly, for predicting elastic properties of fluids using well log data, the adiabatic form of the Benedict-Webb-Rubin equation has been found to be unexpectedly accurate in predicting the gas bulk modulus Kg*. Reason: at the frequencies of interest, i.e., around 20 Khz, heat exchange between the rock and gas is of some consequence, assuming moderate pore sizes, and usual values of heat conductivities for the gas. A very important input is the API gas gravity and, in addition, the API oil gravity in cases where the user wishes to consider a total fluid consisting of brine, gas and oil mixtures. It should be pointed out that the three components are in separate phases in the pores spaces of the rock. As the program proceeds, calculations for different gas and oil saturations occur, varying the gas saturation over 18 values from 0 to 100% while also varying within each gas saturation the oil saturation over 6 values from 0 to 100% in steps of 20%. The program requires that the sum of the gas, oil and brine saturations be equal to unity and will stop the calculation and proceed to the next case if the sum of the saturations exceeds unity.

For sandstones and sands, essentially the program does the following. Using its brine-saturated inputs, rho-B, the bulk density and Vp, the compressional wave velocity, in the case of a sandstone subroutine KGKA is called to solve simultaneously Equations 18, 20d and 64. Km is the solid matrix bulk modulus, Gm is the solid matrix shear modulus and P* is the P-wave modulus.

These are a set of non-linear equations in the quantities, a, b, $f_o$ and g defined by equations $a = K_a/K_m$
$b = K^*/K_m$
$g = G^*/G_m$ and $F_o = K_m/K_f - 1$ Since the matrix moduli Km, Gm will be known, one can then solve for the Biot-Gassmann frame modulus Ka, the brine-filled bulk modulus K* and the brine-filled shear modulus G*. Kf is the total fluid modulus.

For carbonates, in the case of a limestone or dolostone the equations are not solved by the halving search of KGKA, but rather another subroutine LIDOS is entered. It uses the set of equations which are linear in the P-wave modulus P*, namely the equations indicated above. There ak, bk, ag, bg are pressure-dependent empirical coefficients.

The Biot-Gassmann equation is again used and the system is solved by LIDOS to give K*, G* and the frame modulus Ka. Ka and G* are independent of the fluid in the pores so that these values can be used over and over again when needed. K* is not so independent, but requires for its calculation a repeated application of the fluid correction and the Biot-Gassmann equations. This is done in subroutine BIOT for the various fluid moduli, Kf, computed by subroutine FLMOD2.

GAS EQUATIONS

The gas modulus and density are computed before entering the DO compute loop in which gas and oil saturations are varied by a subroutine GASMD3. The subroutine GASMD3 essentially solves the Benedict-Webb-Rubin equation for the reciprocal of the pseudo-reduced volume, namely, if $X = 1/Vpr$ as previously explained, which has to be solved for X in a search procedure.

The subroutine GASMD3 first calculates the isothermal gas bulk modulus KISOGAS using Equation 45 et seq., supra. As previously mentioned, such equations relate to an isothermal nonideal gas law of state in pseudo-reduced form. Its quantities gamma-r, Bor, Aor, Cor, br, ar, alpha-r are the Benedict-Webb-Rubin coefficients given in the reference of record.

Next, GASMD3 evaluates the specific heat of the gas at constant pressure, Cp, and the specific heat of the gas at constant volume, Cv, using Equations A1-A24, supra. Specifically, the sequence is to obtain Cpo from Equation A15, use that value in Equation A14 to calculate Cvo; then use that value of Cvo in Equation A12 to calculate Cv. Then having Cpr-Cor and Cv values, use Equation A6 to compute Cp. Thus, Cp/Cv can be obtained (by association) for computing the adiabatic gas modulus KADGAS using Equation 58a, supra.

As mentioned hereinbefore, a parameter GASMIX is input to the subroutine to calculate the gas bulk modulus Kgas via Equations 58b and 58c. I.c., if GASMIX=1, the adiabatic value for Kgas is calculated in Equation 58c.

An additional feature: while previously the user had to accept built-in values for the average elastic properties Km and Gm, in GASMD3, the user can input his own values under the parameter heading KMDEF and GMDEF of the listing infra.

Upon exit from GASMD3, the user is provided with the gas bulk modulus Kgas and the gas density rho-gas. An inner loop is next entered in which the gas and oil saturations are varied as described above. For each particular gas, oil and brine saturation adding up to unity, a subroutine FLMOD2 is entered with the saturations and with the porosity, which calculates the effective fluid bulk modulus, Kf, by means of applications of Wood's equation for the fluid moduli (Wood's equation states that the total fluid bulk modulus Kf is given by $1/Kf_3 = Sgas/Kgas + Soil/Koil + (1 - Sgas - Soil)/Kbrine$, where Sgas and Soil are fractional gas and oil saturations.), and the new bulk density RHOBC, which reflects the new fluid mixture, is calculated. What varies as this routine is entered are the saturations, the effective fluid moduli and the effective bulk density. The BIOT subroutine is then entered, and using the original and unchanging frame modulus Ka makes the fluid correction yielding the current K* for the current oil and gas saturations.

The routine also calculates the oil bulk modulus and density, since these are necessary parts of the fluid moduli and density calculations, as previously indicated.

Upon exit from FLMOD2, an effective Poisson's ratio, sigma*, is calculated, and in addition the P-wave velocity and S-wave velocities for this case are obtained from the current K* and rho-B values using $$\sigma^* = (3K^* - 2G^*)/(6K^* + 2G^*)$$

$$P^* = \rho_B V_p^2 = K^* (4/3)G^*, \rho_B V_s^2 = G^*$$

For each pair of these saturations, the P-wave velocity, the S-wave velocity, the Poisson's ratio, and the bulk density, are printable. Such data constitutes the main output of the program.

Note further in the program that for assumed conditions, the modulus Kf=25 Kbar (to be within the accuracy needed) is pressure-independent. However, as estimate of Km, Gm, and a relationship between a and g are also needed.

To estimate Km and Gm, all information on rock composition of a given area (basin, formation, well, etc.) must be used, i.e., using samples or logs (nuclear, etc.). But mean values for Km and Gm are fairly accurate for many sands, consolidated or not, viz:

$$Ka = 393 \text{ Kbar}; Gm = 361 \text{ Kbar} \qquad (65)$$

The standard deviations of the above quantities for several samples measured were 7% and 12% respectively. Extensive calculations with and without physical models, with sandstone data, produced the acceptable empirical relationship between a and g previously indicated, i.e., Equation 64, supra $$a - g = f_3(c, a+g) \qquad (64)$$

where c is an adjustable empirical parameter, a and g are as described above, and $f_3$ is a functional operator which relates to the variables of interest in an empirical fashion. It was surprising found by minimizing the rms error between predicted and measured moduli values and is pressure-independent in the above approximation. The correlation coefficients for estimating K* and G* using Equation 64 are both over 0.95.

Final data base includes suites for all lithologies of interest, with densities and porosities measured and with all compressional-wave and shear-wave velocities measured as functions of pressure. In addition, compositions were determined by an overlapping suite of measurements to give estimates of Km and Gm. Equation 18 supra gives G*, P* and K*; with values of Km and Gm, a and g can then be provided. Equation 64 then gives a c-value for each sample. Such c-values were found not to be significantly correlated with either G, $\phi$, Km/Gm, Gm, or some other pertinent parameters.

Samples containing substantial amounts of carbonates or high-elastic-modulus iron minerals, e.g., had somewhat negative correlations of c with Km. Deleting such samples from the data base reduced the suite of hard sandstones slightly. A slight negative correlation also existed between c and pressure.

By adopting the above equations and the value Kf=25 Kbar, all the information needed to use Equations 18 and 20d become available. The computation, however, is easy to do only "backwards"; that is, by starting with some value of (a+g) and computing (a−g), a and g. Then Equation 20d gives b, and finally, Equation 18 gives P*. Of course, use of the definitions of the various quantities as indicated above is mandatory.

To use P* and $\phi$ to compute K*, Ka, G*, etc., one approach is to program an iterative solution as set forth below. But also, another approach would be to start with various values of (a+g) and construct plots or of the desired quantities as functions of P* for various values of $\phi$, as also indicated blow.

CARBONATES

In the case of a limestone or dolostone, Equations 18, 20d, 33 and 34 are not directly solved by the method outlined above; instead, a new set of equations can be used, viz., Equations 20d, 21 and 22, supra; these equations which are functions of the P-wave modulus, P*, are used to solve for bulk and shear moduli (K* and G*) and the frame modulus (Ka) is next solved using the relationship a=Ka/Km; b=K*/Km; g=G*/Gm; and f=Km/Kf−1. For carbonates, it is preferable that Equation 20d be rewritten as follows:

$$a = \frac{(f\phi + 1)b - 1}{f\phi + b - 1} \qquad (20f)$$

Note in the above calculations that Ka and G* are independent of the fluid in the pore space, so that the former values can be used over again as needed. The variable K* is not independent, but requires repeated application of the fluid correction and the Biot-Gassmann Equations 20-20f. This can routinely be achieved for various fluid moduli as specified in detail below.

Note that the present invention not only allows the experimenter to specify that the formation is initially 100% brine saturated and that the lithology is sandstone, limestone or dolostone, but also to be able to specify isothermal or adiapatic conditions for the calculation of the gas modulus, Kgas. Detailed mineralogy also permits him also to make a more accurate estimate, but it is not a necessary input variable. If detailed mineralogy is known, the volume percent of each component must be input in a manner shown in the method set forth below.

The program uses the Voigt-Reuss-Hill (VRH) method to calculate the bulk modulus, Km, and the shear modulus, Gm, of the solid part of the rock.

If the detailed mineralogy is not used, the method of the present invention automatically defaults to "average" values of Km and Gm for each lithology.

If a rock is widely different in composition from "average" rocks, detailed mineralogy is necessary in order to do accurate estimates. For example, if a limestone contained quartz beyond about 25%, the Km, Gm default values for limestones could lead one into significant errors in estimation of fluid effects.

Data banks for the process of the invention, of course, must come from a 100%-brine-saturated section of a well. If Km and Gm are known from mineralogical analysis, such values are used. If not, the assumed values of 393 and 361 Kbar, respectively, are available. The solution to Gassmann's equation is very sensitive to errors in Km only when the porosity is low. As the major application of these equations is intended to be in high-porosity "soft" rocks, errors in Km are not apt to be a major drawback.

Note the general expression for Vp for any fluid saturant:

$$V_p = \left[ 1/\rho_b \left\{ K_a + \frac{(1 - K_a/K_m)^2}{\phi/K_f + (1 - \phi)/K_m - K_a/K_m^2} + (4/3)G^* \right\} \right]^{\frac{1}{2}}$$

where Kfg equals the bulk modulus for a brine-gas mixture.

ITERATIVE METHOD IN DETAIL

The objective is to start with assumed values of Km, Gm, and Kf, and the measured values of p* and $\phi$; and then to use the empirical relationship in Equation 34 and Gassmann's Equation 20d supra to estimate Ka, K*, Kfc and G*. A simple iterative calculation with interval-halving to update the variable (a+g) of Equation 34 is available, and such sequence is as follows:

(1) From the current value of (a+g), calculate (a−g); then solve for a and g, and use Gassmann's equation 20d to get b. Use Equations 33 and 18 and the definitions of the quantities to get trial values of K*, G* and finally P*. Let the trial value of P* be P'; the error in P* is then p'−P*.

(2) If the sign of the error is opposite to that of the preceding error, divide the increment for updating (a+g) by −2. That is, if (P'−P*) has crossed zero, reverse directions and use steps only half as large.

(3) Update (a+g) by adding the current size and sign of the increment, as mentioned above.

(4) If the increment [or (P'−P*)] is satisfactorily small, terminate the iteration. Otherwise, repeat from Step (1).

Suitable starting values are (a+g)=0, increment=+0, 4, and negative (P'−P*). The results for (a+g), (a−g) and K* are easily used to calculate the various parameters.

APPENDIX

Having now briefly described the operation of the CPU 51 and of an instruction set for operation of a particular type microprocessor system, e.g. MGS 6500, the program listing for carrying out, in the main, the method of the present invention is of consequence and is set forth below in detail.

The listing is divided into two sections. Section A contains comments as to the purpose and scope of the method. E.g., Steps 40000–220000 detail the purpose and limitations of the method; Steps 230000–1040000 indicate the form and nature of the input data; Steps 1050000–1210000 state the form and nature of the output information; Steps 1220000–1280000 indicate what error messages are to be expected; Steps 1290053–1310000 indicate the nature and scope of subroutines, etc.

Section B describes the method in detail for calculating various petrophysical parameters of interest. Note the designated instruction numbers describe particular operations as carried by the subsequent instructions. These commands provide in sequence form the operations previously described with reference to FIGS. 4 and 5. Comparison of actual versus synthetic values then occurs on a separate internal (or external) basis as previously described.

SUMMARY

The program has a variety of potential uses, especially in wells where shear wave data are either unavailable or unreliable. It should be of most value in wells where the rocks are "soft", i.e., they are poorly cemented, fractured or have high porosity. Fluid effects in general tend to diminish with increasing effective pressure, so these concepts will be more likely applicable at shallow depths. They will also, in general, be more observable in young rather than old sediments.

Hard, low-porosity and well-cemented rocks of any lithology are poor candidates to attempt these types of calculations.

Among the sands, the more soil-like materials are the most likely, and the well-cemented quartzites the least likely, candidates.

The order among carbonates is (1) chalks; (2) elastics; and (3) reefs.

The user is advised to be cautious in applying the invention to abnormally pressured formations, inasmuch as empirical relationships are established for normal fluid pressures. Additionally, possible fluid pressure dependence may alter the validity of the numerical constants. Furthermore, othe uncertainties could be emergent, due to the fact that the invention cannot take into account possible changes in proosity resulting from alteration in the fluid pressure gradient. This inability to take these porosity changes into account could lead to apparently anomalous calculated velocities. Hence, if the user attempts to model an abnormally pressured section by altering the fluid pressure gradient, he should bear in mind these cautions.

Inputting incompatible brine-saturated velocities, porosities and/or densities will lead to a warning message to the user that he has violated an elastic lower-bound condition; however, the calculations will proceed. Further in summary, the invention has proven to be surprisingly accurate in computing the change in compressional-wave velocity due to a change in pore fluids. Examples of calculations include two poorly consolidated sands from a documentable well, offshore Louisiana, and such estimates correlate surprisingly well with laboratory results.

CONCLUSION

From the above, it is apparent that the method of the present invention as described hereinbefore provides a well-log interpreter with a strong tool for determining amounts of gas/oil-filled reservoirs in a variety of structural combinations, e.g., in sand, limestone, etc. However, the invention is not limited to the above structural combination but is applicable to other anomalous circumstances as known, to those skilled in the art. E.g., while the above presentations were directed in the most part to creating synthetic gas/oil-indicating characteristics for sandstones, limestone or dolostone at different saturations, other strata can be used. It should thus be understood that the invention is not limited to any specific embodiments set forth herein, as variations are readily apparent, and thus the invention is to be given the broadest possible interpretation within the terms of the following claims.

We claim:

1. System for resolving event characteristics of an acoustic log of a first well so as to determine gas/oil fractions in a selected zone of an earth formation by creating synthetic gas-indicating characteristics from petrophysical parameters corresponding to said selected zone of interest associated with a second well of substantially zero hydrocarbon potential, comprising:

(a) means for obtaining said acoustic log for said first well;

(b) means for determining actual compressional velocity and density values of said zone of interest based on field information associated with said second well in which selection of a zonal lithology from a group comprising sandstone, limestone and dolostone occurs;

(c) a digital programmable computer for:
  (i) predicting brine-saturated bulk and shear moduli (Kw* and Gw*) using empirical equations containing coefficients and said P-wave modulus value (Pw*), said coefficients varying in empirical fashion as a function of at least porosity, pressure and temperature;
  (ii) estimating a frame modulus value (Ka) of said zone of interest using a relationship involving Kw*, Kb, Km and $\phi$, where Kw* is brine-saturated bulk density of the aggregate, Kb is the bulk modulus of brine, and Km is the bulk modulus of the solid material making up the zone of interest and $\phi$ is porosity;
  (iii) predicting bulk modulus K* values with the gas/oil present in said zone of interest in differing amounts using a relationship involving Ka of step (ii), Km, $\phi$, Kf, where Kf is the bulk modulus of a liquid-gas mixture of a selected oil/gas gravity and saturation;
  (iv) assuming Gw* is equal to Ggas/oil*, predicting P-wave modulus values of the zone with gas/oil present (Pgas/oil*) based on the relationship $$P_{gas/oil^*} = K_{gas^*} + (4/3)G_{w^*}$$

(v) predicting acoustic velocities within said zone from said P-wave modulus values (Pgas/oil*) of step (iv) as a function of said selected gas/oil gravity and saturation; and (d) comparitor means comparing said predicted velocities or derivations thereof with actual velocities or derivations thereof, of (a) associated with said acoustic log of said first well to predict presence and amounts of gas/oil fractions in said zone of interest at said first well.

2. System of claim 1 in which said computer under (iii) also predicts a gas bulk modulus component (KADGAS) for each of said predicted bulk moduli K* under an adiabatic form of the Benedict-Webb-Rubin equation in accordance with $$KADGAS = Cp/Cv \cdot KISOGAS$$

where Cp is the specific heat of gas of constant pressure, Cv is the specific heat of gas at constant volume and KISOGAS is the isothermal form of Benedict-Webb-Rubin equal to $$K_{isog^*pr}P_{pc} = XT_{pr} + 2S_1X^2 + 3S_2X^3 + 6S_3X^6 +$$
$$C_r e^{-\gamma_r X^2}(2\gamma_r X^2 - 7\gamma_r X^5 + 3X^3)/T_{pr}^2$$

where:

(i) $K_{isog^*pr}$ is the pseudo-reduced bulk modulus equal to the first term of the above equation in which X is the reciprocal of the pseudo-reduced volume, $T_{pr}$ is the pseudo temperature, Cr and gamma-r are coefficients and $S_1$ and $S_2$ are functions of $T_{pr}$ and $S_3$ is a function of gamma-r; and (ii) $P_{pc}$ is the pseudo-critical pressure which varies as a function of gas gravity (gamma).

3. System of claim 2 in which (D) repeats in sequence velocity comparisons for different zones of said earth formation and at different depths within said formation so as to provide a multiplicity of compared and predicted gas/oil-saturated zones of said formation as a function of depth.

4. System for resolving event characteristics of a sonic log of a first well so as to determine gas/oil fractions in a selected zone of an earth formation by creating synthetic gas-indicating characteristics from brine-saturated petrophysical parameters corresponding to said selected zone of interest including a programmable digital computer having a CPU-control means, program and data memories connected to said CPU-control means and display-storage means also connected to said CPU-control means, comprising:

(a) means for obtaining said acoustic log for said first well;

(b) means for determining actual compressional velocity and density values of said zone of interest based on field information associated with said second well in which selection of a zonal lithology from a group comprising sandstone, limestone and dolostone occurs;

(c) said CPU-control means of said digital computer operating on data within said data memory under control of program statements initially held in said program memory but sequentially fetched to said CPU-control means so as:
  (i) from brine-saturated bulk and shear moduli (Kw* and Gw*), calculated by empirical equations including a true P-wave modulus value (Pw*) corresponding to said zone of interest based on said actual velocity and density values of (a) and estimated frame modulus values (Ka) of said zone of interest, to predict bulk modulus values K* with gas/oil present in said zone of interest in differing amounts;
  (ii) to predict P-wave modulus values of the zone with gas/oil present (Pgas/oil*) based on the relationship $$P_{gas/oil^*} = K^*_{gas/oil} + (4/3)G^*_w$$

(iii) to predict sonic velocities within said zone (Pgas/oil*) from said P-wave modulus values of step (ii) as a function of gas/oil saturation;
  (iv) to compare said predicted sonic velocities or derivations thereof with actual velocities or similar derivatives thereof, of (a) associated with said log of said first well to predict amounts of gas/oil fractions in said zone of interest at said first well.

5. System of claim 4 in which said CPU-control means under (i) also predicts a gas bulk modulus component (KADGAS) for each bulk modulus K* under an adiabatic form of Benedict-Webb-Rubin in accordance with the equation $$KADGAS = Cp/Cv \cdot KISOGAS$$

where Cp is the specific heat of gas at constant pressure, Cv is the specific heat of gas at constant volume and KISOGAS is the isothermal form of Benedict-Webb-Rubin equal to $$K_{isog*pr}P_{pc} = XT_{pr} + 2S_1X^2 + 3S_2X^3 + 6S_3X^6 + C_r e^{-\gamma_r X^2}(2\gamma_r X^2 - 7\gamma_r X^5 + 3X^3)/T_{pr}^2$$

where:
  (i) $K_{isog*pr}$ is the pseudo-reduced bulk modulus equal to the first term of the above equation in which X is the reciprocal of the pseudo-reduced volume, $T_{pr}$ is pseudo temperature, Cr and gamma-r are coefficients and $S_1$ and $S_2$ are functions of $T_{pr}$ and $S_3$ is a function of gamma-r; and
  (ii) $P_{pc}$ is the pseudo-critical pressure which varies as a function of gas gravity (gamma).

6. System for resolving event characteristics of a sonic log of a first well so as to determine gas/oil fractions in a selected zone of an earth formation by creating synthetic gas/oil-indicating characteristics from brine-saturated petrophysical parameters corresponding to said selected zone of interest but associated with a second well of substantially zero hydrocarbon potential, comprising:
  (a) means for obtaining said acoustic log for said first well;
  (b) means for determining actual compressional velocity and density values of said zone of interest based on field information associated with said second well in which selection of a zonal lithology from a group comprising sandstone, limestone and dolostone, occurs;
  (c) a programmable digital computer for:
    (i) from calculated normalized brine-saturated petrophysical parameters involving data of (b) predicting compressional velocities of said zone with gas/oil in differing amounts present in said zone, in accordance with the relationship $$V_p = \left[ 1/\rho_b \left\{ K_a + \frac{(1 - K_a/K_m)^2}{\phi/K_f + (1 - \phi)K_m - K_a/K_m^2} + (4/3)G^* \right\} \right]^{\frac{1}{2}}$$

where rho—b is the bulk density, $\phi$ is the porosity, $G^*$ is the shear modulus at the saturations of interest, $K_f$ equals the bulk modulus for the liquid-gas mixture, $K_a$ is the frame modulus, $K_m$ is the bulk modulus of a hypothetical rock, i.e., same composition but perfectly cemented with zero porosity;
    (ii) from sonic velocities of said zone calculated from (i), predicting synthetic sonic response information with gas/oil present in said zone; and
    (iii) comparing said predicted sonic response information with gas/oil present with said actual field-acquired sonic logging response data of said sonic log of (A) so as to determine both presence and amounts of gas/oil within said zone of interest at said first well.

7. System of claim 6 in which (i) is further characterized by:
  simultaneously solving through iteration the following equations:

$$\rho_B V_p^2 = P^* = K^* + (4/3)G^* \quad (1)$$

$$(K^* - K_a)/K_m = K_{fc}/K_m = b - a = \quad (2)$$

$$\frac{(1 - a)^2}{f\phi + (1 - a)} = \frac{(1 - b)^2}{f\phi - (1 - b)}$$

$$a - g = f_3(c, a + g) \quad (3)$$

to provide estimations of $K_a$ and $G^*$ as a function of fluid saturation, where:
  rho—b is the bulk density of the zone of interest;
  $V_p$ is the compressional velocity;
  $P^*$ is the P-wave modulus at said saturations of interest;
  $K^*$ is the bulk modulus at said saturations of interest;
  $G^*$ is the shear modulus at said saturations of interest;
  $K_a$ and $G_a$ are frame moduli;
  $K_{fc}$ is the fluid correction equal to $K^* - K_a$;
  $K_m$ and $G_m$ are the bulk and shear moduli of a hypothetical rock (i.e., same composition but perfectly cemented with zero porosity);
  $\phi$ = porosity;
  $a = K_a/K_m$
  $b = K^*/K_m$
  $g = G^*/G_m = G_a G_m$
  $f - (K_m/K_f) - 1$
  C is an empirical parameter and
  $f_3$ describes a functional operator which relates to the variables of interest of Equation (3).

8. System of claim 7 in which said iteration includes:
  (i) predicting brine-saturated bulk and shear moduli ($Kw^*$ and $Gw^*$) using empirical equations containing coefficients and a P-wave modulus value ($Pw^*$), said coefficients varying in empirical fashion as a function of at least porosity, pressure and temperature, said P-wave modulus value ($Pw^*$) being a true P-wave modulus value which corresponds to said zone of interest based on data of (b) associated with said second well, said shear modulus $Gw^*$ being equal to $Ggas/oil^*$ where $Ggas/oil^*$ is the shear modulus of said zone with gas/oil present;
  (ii) estimating frame modulus values (Ka) of said zone of interest using a relationship involving $Kw^*$, Kb, Km and $\phi$, where $Kw^*$ is brine-saturated bulk density of the aggregate, Kb is the bulk modulus of brine, and Km is the bulk modulus of the solid material making up the zone of interest and $\phi$ is porosity.

9. Method for resolving event characteristics of an acoustic log of a first well so as to determine gas/oil fractions in a selected zone of an earth formation by creating synthetic gas-indicating characteristics from petrophysical parameters associated with a second well of substantially zero hydrocarbon potential, comprising:
  (a) obtaining said acoustic log for said first well by field measurement;
  (b) determining actual compressional velocity and density values of said zone of interest based on field information associated with said second well in which selection of a zonal lithology from a group comprising sandstone, limestone and dolostone, occurs;
  (c) predicting brine-saturated bulk and shear moduli ($Kw^*$ and $Gw^*$) for said lithology of step (b) using empirical equations containing coefficients and a P-wave modulus value (Pw*), said coefficients varying in empirical fashion as a function of at least porosity, pressure and temperature, said P-wave modulus value (Pw*) being a true P-wave modulus value which corresponds to said zone of interest, based on data of (b) associated with said second well;

(d) estimating a frame modulus value (Ka) of said lithology of said zone of interest using a relationship involving Kw*, Kb, Km and $\phi$, where Kw* is brine-saturated bulk density of the aggregate, Kb is the bulk modulus of brine, Km is the bulk modulus of the solid material making up said formation at said zone of interest and $\phi$ is porosity;

(e) predicting a bulk modulus value K* with the gas/oil present at said zone of interest using a relationship involving Ka of step (d), Km, $\phi$, Kf, where Kf is the bulk modulus of a gas/oil/brine mixture of a selected gas/oil gravity and saturation;

(f) assuming Gw* is equal to Ggas/oil*, predicting a P-wave modulus value of the zone with gas/oil present (Pgas/oil*) based on the relationship $$P_{gas/oil*} = K^*_{gas/oil} + (4/3)G^*_w$$

(g) predicting at an acoustic velocity at said zone from said P-wave modulus values (Pgas/oil*) of step (f);

(h) repeating steps (e)–(f) for a series of gas/oil-brine mixtures of different gas/oil gravities and saturations to provide a suite of synthetic acoustic velocities at said zone of interest as the function of a plurality of gas/oil gravities and saturations; and (i) comparing said suite of estimated velocities with velocity information associated with said actual acoustic log of (a) of said first well to accurately predict presence and amounts of gas/oil fractions at said zone of interest.

10. Method of claim 9 in which said K* of step (e) comprising a gas modulus component (Kg*) and oil bulk modulus (Koil*) at selected saturations and gravities, and whose saturations vary in accordance with Sol+Sgas<1.0.

11. Method of claim 10 in which said gas bulk modulus component (KADGAS) and is calculated under an adiabatic form of Benedict-Webb-Rubin in accordance with the equation $$KADGAS = Cp/Cv \cdot KISOGAS$$

where Cp is the specific heat of gas at constant pressure, Cv is the specific heat of gas at constant volume and KISOGAS is the isothermal form of Benedict-Webb-Rubin equal to $$K_{isog*pr}P_{pc} = XT_{pr} + 2S_1X^2 + 3S_2X^3 + 6S_3X^6 + C_r e^{-\gamma_r X^2}(2\gamma_r X^2 - 7\gamma_r X^5 + 3X^3)/T_{pr}^2$$

where:

(i) $K_{isog*pr}$ is the pseudo-reduced bulk modulus equal to the first term of the above equation in which X is the reciprocal of the pseudo-reduced volume, $T_{pr}$ is pseudo temperature, Cr and gamma-r are coefficients and $S_1$ and $S_2$ are functions of $T_{pr}$ and $S_3$ is a function of gamma-r; and (ii) $P_{pc}$ is the pseudo-critical pressure which varies as a function of gas gravity (gamma).

12. Method of claim 11 in which said oil bulk modulus Koil* is calculated in accordance with the equation $$Koil^* = 36 \text{ rho-oil} - 19.6 = 141.5/\text{gamma-oil} + 131.5$$

where rho-oil is the oil density and gamma-oil is the oil gravity (API).

13. Method for resolving event characteristics of an acoustic log of a first well so as to determine gas/oil fractions at a selected zone of an earth formation by creating synthetic gas-indicating characteristics from petrophysical parameters corresponding to said selected zone of interest of substantially zero hydrocarbon potential, comprising the steps of:

(a) obtaining said acoustic log for said first well by field measurement;

(b) determining actual compressional velocity and density values of said zone of interest based on field information associated with said zone in and about its area of zero hydrocarbon potential in which selection of a zonal lithology from a group comprising sandstone, limestone and dolostone, occurs;

(c) from brine-saturated bulk and shear moduli (Kw* and Gw*), calculated by empirical equations including a true P-wave modulus value (Pw*) which corresponds to said zone of interest based on data of (b) and estimated frame modulus values (Ka) at said zone of interest, predicting bulk modulus K* with the gas/oil present at said zone of interest in said first well in varying amounts;

(d) predicting P-wave modulus values at said zone with gas/oil present (Pgas/oil*) in said varying amounts based on the relationship $$P_{gas/oil*} = K^*_{gas/oil} + (4/3)G^*_w$$

(e) predicting acoustic velocities at said zone in said first well from step (d) as a function of gas/oil saturation;

(f) indexing predicted and actual velocity values of (a) as a function of different gas/oil saturation and gravities; and (g) determining a best match of all indexed values so as to predict amounts of gas/oil at said zone of interest.

14. Method of claim 13 in which said predicted bulk modulus K* of step (c) includes a gas bulk modulus component (KADGAS) calculated under an adiabatic form of Benedict-Webb-Rubin in accordance with the equation $$KADGAS = Cp/Cv \cdot KISOGAS$$

where Cp is the specific heat of gas at constant pressure, Cv is the specific heat of gas at constant volume and KISOGAS is the isothermal form of Benedict-Webb-Rubin equal to $$K_{isog*pr}P_{pc} = XT_{pr} + 2S_1X^2 + 3S_2X^3 + 6S_3X^6 + C_r e^{-\gamma_r X^2}(2\gamma_r X^2 - 7\gamma_r X^5 + 3X^3)/T_{pr}^2$$

where:

(i) $K_{isog*pr}$ is the pseudo-reduced bulk modulus equal to the first term of the above equation in which X is the reciprocal of the pseudo-reduced volume, $T_{pr}$ is pseudo temperature, Cr and gamma-r are coefficients and $S_1$ and $S_2$ are functions of $T_{pr}$ and $S_3$ is a function of gamma-r; and (ii) $P_{pc}$ is the pseudo-critical pressure which varies as a function of gas gravity (gamma).

15. Method for resolving events of an acoustic log of a first well associated with at least a selected zone of an earth formation so as to determine gas/oil fractions therein by creating synthetic gas/oil-indicating characteristics from brine-saturated petrophysical parameters corresponding to said selected zone of interest at a second well of substantially zero hydrocarbon potential, comprising the steps of:

(a) obtaining said acoustic log for said first well by field measurement;

(b) determining actual compressional velocity and density values of said zone of interest based on field information associated with said second well in which selection of a zonal lithology from a group comprising sandstone, limestone and dolostone, occurs;

(c) from brine-saturated bulk and shear moduli (Kw*) and Gw*) calculated from empirical equations including a true brine-saturated P-wave modulus value (Pw*) which corresponds to said zone of interest based on data of (b) associated with said second well, and estimated frame modulus values (Ka) of said zone of interest, predicting a plurality of bulk moduli (K*) with gas/oil present in said zone of interest in preselected amounts;

(d) predicting a multiplicity of P-wave moduli of said zone with gas/oil present (Pgas/oil*) in said preselected amounts based on the relationship $$P_{gas/oil}* = K*_{gas/oil} + (4/3)G*_w$$

where Pgas/oil* is a multiplicity of predicted P-wave moduli with gas/oil present in said preselected amounts; Kgas/oil* is a plurality of predicted bulk moduli of said zone with gas/oil present in said preselected amounts; Gw* is the brine-saturated shear modulus of said zone;

(e) predicting synthetic acoustic values from acoustic velocities within said zone calculated from step (d) as a function of different gas/oil gravities and saturations; and (f) comparing said synthetic values indexed to different gas/oil gravities and/or saturations with actual field-produced values produced from said acoustic log of (a) to predict amounts of gas/oil in said zone of interest at said first well.

16. Method of claim 15 in which each of said predicted bulk moduli K* includes a gas bulk modulus component KADGAS calculated under an adiabatic form of Benedict-Webb-Rubin in accordance with the equation $$KADGAS = Cp/Cv \cdot KISOGAS$$

where Cp is the specific heat of gas at constant pressure, Cv is the specific heat of gas at constant volume and KISOGAS is the isothermal form of Benedict-Webb-Rubin equal to $$K_{isog}*_{pr}P_{pc} = XT_{pr} + 2S_1X^2 + 3S_2X^3 + 6S_3X^6 +$$
$$C_r e^{-\gamma_r X^2}(2\gamma_r X^2 - 7\gamma_r X^5 + 3X^3)/T_{pr}^2$$

where:

(i) $K_{isog}*_{pr}$ is the pseudo-reduced bulk modulus equal to the first term of the above equation in which X is the reciprocal of the pseudo-reduced volume, $T_{pr}$ is pseudo temperature, Cr and gamma-r are coefficients and $S_1$ and $S_2$ are functions of $T_{pr}$ and $S_3$ is a function of gamma-r; and (ii) $P_{pc}$ is the pseudo-critical pressure which varies as a function of gas gravity (gamma).

17. Method of claim 16 in which said determination of synthetic characteristics is limited to estimations of gas fractions only.

18. Method of claim 16 in which said determination of synthetic characteristics is limited to estimations of oil fractions only.

19. Method for resolving event characteristics of an acoustic log of a first well so as to determine gas/oil fractions in a selected zone of an earth formation by creating synthetic gas/oil-indicating characteristics from brine-saturated petrophysical parameters corresponding to said selected zone of interest located at a second well of substantially zero hydrocarbon potential, comprising the steps of:

(a) obtaining said acoustic log for said first well by field measurement;

(b) determining actual compressional velocity and density values of said zone of interest based on field information associated with said second well in which selection of a zonal lithology from a group comprising sandstone, limestone and dolostone, occurs;

(c) from calculated normalized brine-saturated petrophysical parameters involving a true brine-saturated P-wave modulus value obtained from (b) corresponding to said zone of interest at said second well, predicting velocities of said zone with gas/oil in differing amounts present in said zone, in accordance with the relationship $$V_p = \left[ 1/\rho_b \left\{ K_a + \frac{(1 - K_a/K_m)^2}{\phi/K_f + (1 - \phi)K_m - K_a/K_m^2} + (4/3)G* \right\} \right]^{\frac{1}{2}}$$

where rho−b is the bulk density, $\phi$ is the porosity, G* is the shear modulus at the saturations of interest, $K_f$ equals the bulk modulus for the liquid-gas mixture, $K_a$ is the frame modulus, $K_m$ is the bulk modulus of a hypothetical rock, i.e., same composition but perfectly cemented with zero porosity; and (d) comparing said predicted velocity information with actual field-acquired data associated with said acoustic log of (a) associated with said first well, so as to determine both presence and amounts of gas/oil within said zone of interest at said first well.

20. Method of claim 18 in which step (c) is further characterized by:
simultaneously solving through iteration the following equations:

$$\rho_B V_p^2 = P* = K* + (4/3)G* \quad (1)$$

$$(K* - K_a)/K_m = K_{fc}/K_m = b - a = \quad (2)$$

$$\frac{(1-a)^2}{f\phi + (1-a)} = \frac{(1-b)^2}{f\phi - (1-b)}$$

-continued
$$a - g = f_3(c, a + g) \quad (3)$$

to provide estimations of $K_a$ and $G^*$ as a function of fluid saturation, where:

rho−b is the bulk density of the zone of interest;
$V_p$ is the compressional velocity;
$P^*$ is the P-wave modulus at said saturations of interest;
$K^*$ is the bulk modulus at said saturations of interest;
$G^*$ is the shear modulus at said saturations of interest;
$K_a$ and $G_a$ are frame moduli;
$K_{fc}$ is the fluid correction equal to $K^* - Ka$;
$K_m$ and $G_m$ are the bulk and shear moduli of a hypothetical rock (i.e., same composition but perfectly cemented with zero porosity);
$\phi$ = porosity;
$a = K_a/K_m$
$b = K^*/K_m$
$g = G^*/G_m = G_a/G_m$
$f - (K_m/K_f) - 1$
C is an empirical parameter and
$f_3$ describes a functional operator which relates to the variables of interest of Equation (3).

21. Method of claim 19 in which said iteration includes:
(i) predicting brine-saturated bulk and shear moduli ($Kw^*$ and $Gw^*$) using empirical equations containing coefficients and a P-wave modulus value ($Pw^*$), said coefficients varying in empirical fashion as a function of at least porosity, pressure and temperature, said shear modulus $Gw^*$ being equal to $Ggas/oil^*$ where $Ggas/oil^*$ is the shear modulus of said zone with gas/oil present;
(ii) estimating frame modulus values (Ka) of said zone of interest using a relationship involving $Kw^*$, Kb, Km and $\phi$, where $Kw^*$ is brine-saturated bulk density of the aggregate, Kb is the bulk modulus of brine, and Km is the bulk modulus of the solid material making up the zone of interest and $\phi$ is porosity.

* * * * *